United States Patent
Drenth et al.

(10) Patent No.: US 12,553,298 B2
(45) Date of Patent: Feb. 17, 2026

(54) DRILL STRING COMPONENTS HAVING MULTIPLE-THREAD JOINTS

(71) Applicant: Boart Longyear Manufacturing and Distribution Inc., Salt Lake City, UT (US)

(72) Inventors: Christopher L. Drenth, Callander (CA); Keith William Littlely, Clarkson (AU)

(73) Assignee: Boart Longyear Manufacturing And Distribution Inc., Salt Lake City, UT (US)

(*) Notice: Subject to any disclaimer, the term of this patent is extended or adjusted under 35 U.S.C. 154(b) by 0 days.

(21) Appl. No.: 18/405,631

(22) Filed: Jan. 5, 2024

(65) Prior Publication Data

US 2024/0218749 A1  Jul. 4, 2024

Related U.S. Application Data

(63) Continuation of application No. 16/709,552, filed on Dec. 10, 2019, now Pat. No. 11,898,404, which is a continuation of application No. 15/848,237, filed on Dec. 20, 2017, now Pat. No. 10,570,676, which is a continuation of application No. 14/026,611, filed on Sep. 13, 2013, now Pat. No. 9,850,723, which is a continuation-in-part of application No. 13/717,885, filed on Dec. 18, 2012, now abandoned, which is a continuation-in-part of application No. 13/354,189, filed on Jan. 19, 2012, now Pat. No. 9,810,029.

(Continued)

(51) Int. Cl.
*E21B 17/22* (2006.01)
*E21B 17/042* (2006.01)

(52) U.S. Cl.
CPC ............ *E21B 17/22* (2013.01); *E21B 17/042* (2013.01)

(58) Field of Classification Search
CPC .... E21B 17/042; E21B 17/0423; E21B 17/22; F16L 15/00; F16L 15/02; F16L 15/04; F16L 15/06; F16L 15/08
See application file for complete search history.

(56) References Cited

U.S. PATENT DOCUMENTS

| | | | | |
|---|---|---|---|---|
| 447,775 A | * | 3/1891 | Higbee | F16B 33/02 |
| | | | | 411/386 |
| 5,320,467 A | * | 6/1994 | Erbes | G21C 19/02 |
| | | | | 411/386 |

(Continued)

*Primary Examiner* — James M Hewitt, II
(74) *Attorney, Agent, or Firm* — Ballard Spahr LLP

(57) ABSTRACT

Drill string components having at least two threads extending around a body. The leading end of each thread can have a configuration having increased strength and resistance to jamming and cross-threading. In particular, the leading end of each thread can comprise a planar surface normal to the body. The leading end of each thread can provide an abrupt transition to full thread depth that helps reduce or eliminate cross-threading and can be oriented at an angle relative to the axis of the drill string component. Each thread can further provide at least one of a variable thread width and a variable thread pitch configured to create an axial progressive fit. Each thread can also provide a cylindrical thread root and a thread crest that circumscribes a frusta-cone over at least a portion of the axial length of the threads configured to create a radial progressive fit.

12 Claims, 11 Drawing Sheets

Related U.S. Application Data

(60) Provisional application No. 61/436,331, filed on Jan. 26, 2011, provisional application No. 61/700,401, filed on Sep. 13, 2012.

(56) References Cited

U.S. PATENT DOCUMENTS

| | | | | |
|---|---|---|---|---|
| 5,788,401 A * | 8/1998 | Drenth | ............... | E21B 17/042 |
| | | | | 403/353 |
| 5,810,401 A * | 9/1998 | Mosing | ............... | F16L 15/008 |
| | | | | 285/333 |
| 6,158,785 A * | 12/2000 | Beaulier | ............... | F16L 15/001 |
| | | | | 285/390 |
| 6,435,569 B1 * | 8/2002 | Hopkins | ............... | F16L 15/009 |
| | | | | 285/390 |
| 7,475,917 B2 * | 1/2009 | Sivley, IV | ............... | F16L 15/004 |
| | | | | 285/333 |
| 7,735,879 B2 * | 6/2010 | Toscano | ............... | F16L 15/006 |
| | | | | 285/333 |
| 9,810,029 B2 * | 11/2017 | Drenth | ............... | E21B 17/042 |
| 9,850,723 B2 * | 12/2017 | Drenth | ............... | E21B 17/042 |
| 10,570,676 B2 * | 2/2020 | Drenth | ............... | E21B 17/22 |
| 11,898,404 B2 * | 2/2024 | Drenth | ............... | E21B 17/22 |
| 2003/0168859 A1 * | 9/2003 | Watts | ............... | F16L 15/001 |
| | | | | 285/390 |
| 2010/0123311 A1 * | 5/2010 | Church | ............... | F16L 15/001 |
| | | | | 403/334 |

* cited by examiner

DRILL STRING COMPONENTS HAVING MULTIPLE-THREAD JOINTS

CROSS-REFERENCE TO RELATED APPLICATION

This application is a continuation of U.S. patent application Ser. No. 16/709,552, filed Dec. 10, 2019, entitled "DRILL STRING COMPONENTS HAVING MULTIPLE-THREAD JOINTS," now U.S. Pat. No. 11,898,404, which issued on Feb. 13, 2024, which is a continuation of U.S. patent application Ser. No. 15/848,237, filed Dec. 20, 2017, entitled "DRILL STRING COMPONENTS HAVING MULTIPLE-THREAD JOINTS," now U.S. Pat. No. 10,570,676, which issued on Feb. 25, 2020, which is a continuation of U.S. patent application Ser. No. 14/026,611, filed Sep. 13, 2013, entitled "DRILL STRING COMPONENTS HAVING MULTIPLE-THREAD JOINTS," now U.S. Pat. No. 9,850,723, which issued on Dec. 26, 2017, which is a continuation-in-part of U.S. patent application Ser. No. 13/717,885, filed Dec. 18, 2012, entitled "DRILL STRING COMPONENTS RESISTANT TO JAMMING," now abandoned, which is a continuation-in-part of U.S. application Ser. No. 13/354,189, filed Jan. 19, 2012, entitled "DRILL STRING COMPONENTS RESISTANT TO JAMMING," now U.S. Pat. No. 9,810,029, which issued on Nov. 7, 2017. This application further claims priority to and the benefit of U.S. Provisional Application No. 61/436,331, filed Jan. 26, 2011, entitled "THREAD START FOR THREADED CONNECTORS." This application further claims priority to and the benefit of the filing date of U.S. Provisional Patent Application No. 61/700,401, filed Sep. 13, 2012, entitled "DRILL STRING COMPONENTS HAVING MULTIPLE THREAD JOINTS." The contents of each of the above-identified applications are hereby incorporated herein by reference in their entirety.

BACKGROUND OF THE INVENTION

Field of the Invention

Implementations of the present invention relate generally to components and systems for drilling. In particular, implementations of the present invention relate to drill components comprising increased strength and resistance to jamming, cross-threading and wedging.

Relevant Technology

Threaded connections have been well known for ages, and threads provide a significant advantage in that a helical structure of the thread can convert a rotational movement and force into a linear movement and force. Threads exist on many types of elements, and can be used in limitless applications and industries. For instance, threads are essential to screws, bolts, and other types of mechanical fasteners that may engage a surface (e.g., in the case of a screw) or be used in connection with a nut (e.g., in the case of a bolt) to hold multiple elements together, apply a force to an element, or for any other suitable purpose. Threading is also common in virtually any industry in which elements are mechanically fastened together. For instance, in plumbing applications, pipes are used to deliver liquids or gasses under pressure. Pipes may have threaded ends that mate with corresponding threads of an adjoining pipe, plug, adaptor, connector, or other structure. The threads can be used in creating a fluid-tight seal to guard against fluid leakage at the connection site.

Oilfield, exploration, and other drilling technologies also make extensive use of threading. For instance, when a well is dug, casing elements may be placed inside the well. The casings generally have a fixed length and multiple casings are secured to each other in order to produce a casing of the desired height. The casings can be connected together using threading on opposing ends thereof. Similarly, as drilling elements are used to create a well or to place objects inside a well, a drill rod or other similar device may be used. Where the depth of the well is sufficiently large, multiple drill rods may be connected together, which can be facilitated using mating threads on opposing ends of the drill rod. Often, the drill rods and casings are very large and machinery applies large forces in order to thread the rods or casings together.

Significant efforts have been made to standardize equipment in oilfield, exploration and other drilling industries. In the case of drill rods, both outer and inner diameter standards have been developed and, in the case of threading, multiple threading standards have been developed to allow different manufacturers to produce interchangeable parts. For instance exemplary standardization schemes comprise Unified Thread Standard (UTS), British Standard Whitworth (BSW), British Standard Pipe Taper (BSPT), National Pipe Thread Tapered Thread (NPT), International Organization for Standardization (ISO) metric screw threads, American Petroleum Institute (API) threads, and numerous other thread standardization schemes.

While standardization has allowed greater predictability and interchangeability when components of different manufactures are matched together, standardization has also diminished the amount of innovation in drill component design. In one example, both outer and inner diameters of drill rods have been fixed by industry requirements. Accordingly, the portion of the wall thickness allocated to mating threads operable to transfer drilling loads and to withstand wear due to repeated making and breaking of the drill components must be balanced with the remaining material over the threaded portions of components so that the components can withstand drilling loads and wear due to abrasion against the drilled hole wall and resulting cuttings.

In another example, threads may be created using existing cross-sectional shapes—or thread form—and different combinations of thread lead, pitch, and number of starts. In particular, lead refers to the linear distance along an axis that is covered in a complete rotation. Pitch refers to the distance from the crest of one thread to the next, and start refers to the number of starts, or ridges, wrapped around the cylinder of the threaded fastener. A single-start connector is the most common, and comprises a single ridge wrapped around the fastener body. A double-start connector comprises two ridges wrapped around the fastener body. Threads-per-inch is also a thread specification element, but is directly related to the thread lead, pitch, and start.

While existing threads and thread forms are suitable for a number of applications, continued improvement is needed in other areas such as in high torque, high power, and/or high speed applications. In one instance, existing thread designs are inherently prone to jamming. In another instance, existing thread designs do not use available material effectively. In another embodiment, existing thread designs detract from load capacity of mated components. In yet another instance, existing thread designs exhibit excessive wear.

Jamming is the abnormal interaction between the start of a thread and a mating thread, such that in the course of a single turn, one thread partially passes under another, thereby becoming wedged therewith. Jamming can be particularly common where threaded connectors are tapered. In another instance, existing drill component designs can have limited drilling load capacity and fatigue load capacity as a result of the material afforded to the male thread or to the underlying material on the male end of a drill component.

In certain applications, such as in connection with drill rigs, multiple drill rods, casings, and the like can be made up. As more rods or casings are added, interference due to wedging or cross-threading can become greater. Indeed, with sufficient power (e.g., when made up using hydraulic power of a drill rig) a rod joint can be destroyed. Coring rods in drilling applications also often have threads that are coarse with wide, flat threaded crests parallel to mating crests due to a mating interference fit or slight clearance fit dictated by many drill rod joint designs. The combination of thread tails and flat, parallel thread crests on coarse tapered threads creates an even larger potential for cross-threading interaction, which may not otherwise be present in other applications.

In tapered threads, the opposing ends of male and female components may be different sizes. For instance, a male threaded component may taper and gradually increase in size as distance from the end increases. To accommodate for the increase in size, the female thread may be larger at the end. The difference in size of tapered threads also makes tapered threads particularly prone to jamming, which is also referred to as cross-threading. Cross-threading in tapered or other threads can result in significant damage to the threads and/or the components that include the threads. Damage to the threads may require replacement of the threaded component, result in a weakened connection, reduce the fluid-tight characteristics of a seal between components, or have other effects, or any combination of the foregoing.

For example, tail-type thread starts have crests with a joint taper. If the male and female components are moved together without rotation, the tail crests can wedge together. If rotated, the tail crests can also wedge when fed based on relative alignment of the tails. In particular, as a thread tail is typically about one-half the circumference in length, and since the thread has a joint taper, there is less than half of the circumference of the respective male and female components providing rotational positioning for threading without wedging. Such positional requirements may be particularly difficult to obtain in applications where large feed and rotational forces are used to mate corresponding components. For instance, in the automated making of coring rod connections in the drilling industry, the equipment may operate with sufficient forces such that jamming, wedging, or cross-threading is an all too common occurrence.

Furthermore, when joining male and female components that are in an off-center alignment, tail-type connections may also be prone to cross-threading, jamming, and wedging. Accordingly, when the male and female components are fed without rotation, the tail can wedge into a mating thread. Under rotation, the tail may also wedge into a mating thread. Wedging may be reduced, but after a threading opportunity (e.g., mating the tip of the tail in opening adjacent a mating tail), wedging may still occur due to the missed threading opportunity and misalignment. Off-center threads may be configured such that a mid-tail crest on the mail component has equal or corresponding geometry relative to the female thread crest.

As discussed above, threaded connectors having tail-type thread starts can be particularly prone to thread jamming, cross-threading, wedging, joint seizure, and the like. Such difficulties may be particularly prevalent in certain industries, such as in connection with the designs of coring drill rods. The thread start provides a leading end, or first end, of a male or female thread and mates with that of a mating thread to make a rod or other connection. If the tail-type thread starts jam, wedge, cross-thread, and the like, the rods may need to be removed from a drill site, and can require correction that requires a stop in drilling production.

Additionally, drill rods and casings commonly make use of tapered threads and tapered joints such that the diameters at the thread starts are smaller than the diameters at the thread ends. Tapered threads and joints reduce the amount of cross-sectional material available to transfer loads. Tapered threads and joints are also prone to cross-threading difficulties. Since a coring rod may have a tapered thread, the tail at the start of the male thread may be smaller in diameter than that of the start of the female thread. As a result, there may be transitional geometry at the start of each thread to transition from a flush to a full thread profile. Because the thread start and transitional geometry may have sizes differing from that of the female thread, the transitional geometry and thread start may mate abnormally and wedge into each other.

If there is a sufficient taper on the tail, the start of the male thread may have some clearance to the start of the female thread, such as where the mid-tail geometry corresponds to the geometry of the female thread. However, the transitional geometry of the start of the thread may nonetheless interact abnormally with turns of the thread beyond the thread start, typically at subsequent turns of mating thread crests, thereby also resulting in jamming, cross-threading, wedging, and the like. Thus, the presence of a tail generally acts as a wedge with a mating tail, thereby increasing the opportunity and probability of thread jamming.

The limitations of tail-type thread designs are typically brought about by limitations of existing machining lathes. In particular, threads are typically cut by rotational machining lathes which can only gradually apply changes in thread height or depth with rotation of the part. Accordingly, threads are generally formed to include tails having geometry and tails identical or similar to other portions of the thread start. For instance, among other things, traditional lathes are not capable of applying an abrupt vertical or near vertical transition from a flush to full thread profile to rotation of the part during machining. The gradual change is also required to remove sharp, partial feature edges of material created where the slight lead, or helix angle, of the thread meets the material being cut.

Existing thread designs do not necessarily make effective use of available material. As explained previously, use of overall root and thread taper results in loss of cross-sectional area of a component, and the loss of cross-sectional material results in reduced load capacity and fatigue strength for a given component. In another instance, use of a single thread provides for ease of manufacture and ease of make and break. However, the use of a single thread limits the pressure flank bearing surface area, thus, the load efficiency of the component. This practice also limits the material at the thread flank-to-thread root interface, the location of maximum stress and for fatigue failure crack initiation, and the fatigue strength of the component.

Furthermore, existing thread designs using a single thread result in components that are inherently unbalanced when mating components are brought into contact. Without wishing to be bound by theory and/or simulation, when drill string components having a single-start thread are brought into mating contact, the pin thread is placed in tension and the box thread is placed in compression. It follows that, since the load in a threaded joint moves to the first point of mated contact, there is a higher portion of load taken by the portion of mated thread nearest the first point of contact on one side of the joint. This unsymmetrical load response can create a bending load in mated drill string components and can detract from load capacity.

Wear is the erosion or displacement of thread material from its original position on the thread surface due to the relative mechanical actions of mating threads. Existing thread designs can also be configured to create an interference fit on, for example, the major diameter of the mating components. For instance, the male thread crest can be configured to create a radial interference with the female thread root. As the threads are made up, the interference fit may be a significant source of thread wear as it can add greatly to the contact pressure between the threads as they slide relative to one another. Ultimately, interference fits on thread features increase thread wear. Thread wear degrades the thread geometry thus the load capacity or load efficiency of the drill string component.

Thus, drawback with traditional threads can be exacerbated with drilling components. In particular, the joints of the drill string components can require a joint with a high tension load capacity due to the length and weight of many drill strings. Furthermore, the joint will often need to withstand numerous makes and breaks since the same drill string components may be installed and removed from a drill string multiple times during drilling of a borehole. Similarly, the drill string components may be reused multiple times during their life span. Compounding these issues is the fact that many drilling industries, such as exploration drilling, require the use of thin-walled drill string components. The thin-wall construction of such drill string components can restrict the geometry of the threads.

Accordingly, a need exists for improved thread designs and drilling components that reduce wear, jamming and cross threading as well as use available material effectively to increase drilling load capacity and joint reliability.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

One or more implementations of the present invention overcome one or more of the foregoing or other problems in the art with drilling components, tools, and systems that provide for effective and efficient making of threaded joints. In one aspect, one or more implementations of the present invention comprise drill string components comprising increased strength and resistance to jamming and cross-threading. Such drill string components can reduce or eliminate damage to threads due to jamming and cross-threading. In particular, one or more implementations comprise drill string components having threads with a leading end or thread start oriented at an acute angle relative to the central axis of the drill string component. Additionally or alternatively, the leading end of the threads can provide an abrupt transition to full thread depth and/or width. Additionally or alternatively, the threads can have at least one of a variable thread pitch and a variable thread width. Additionally or alternatively, the threads can have a cylindrical thread root and a thread crest that circumscribes a frusta-cone over at least a portion of the axial length of the threads.

In one aspect, one or more implementation of a threaded drill string component having increased strength and resistance to jamming and cross-threading comprises a hollow body having a first end, an opposing second end, and a central axis extending through the hollow body. The drill string component also comprises at least one thread positioned on the first end of the hollow body. The at least one thread comprises a plurality of helical turns extending along the first end of the hollow body. The at least one thread has a thread depth, a thread width and a thread pitch. The at least one thread comprises a leading end proximate the first end of the hollow body. The leading end of the at least one thread is orientated at an acute angle relative to the central axis of the hollow body. The leading end of the at least one thread faces toward an adjacent turn of the thread. The thread pitch of the at least one thread increases from a first value proximate the leading end over at least a portion of the axial length of the plurality of helical turns thereof to a final value at a desired point on the at least one thread.

In one aspect, one or more implementation of a drill string component having increased strength and resistance to jamming and cross-threading comprises at least one thread having a thread crest and a thread root. The thread root of the at least one thread circumscribes a cylindrical surface over the axial length of the plurality of helical turns thereof. The thread crest of the at least one thread circumscribes a frusta-conical surface extending over at least a portion of the axial length of the plurality of helical turns thereof.

In one aspect, one or more implementations of a drill string component having increased strength and resistance to jamming and cross-threading comprises a drill string component having a plurality of threads.

In one aspect, one or more implementations of a drill string component having increased strength and resistance to jamming and cross-threading comprises a drill string component that eliminates interference fits on thread features. In a further aspect, interference fits are provided at non-thread component features such as such as shoulder surfaces.

In another aspect, one or more implementations of a threaded drill string component having increased strength and resistance to jamming and cross-threading comprises a body, a box end, an opposing pin end, and a central axis extending through the body. The drill string component also comprises a female thread positioned on the box end of the body. The female thread has a depth and a width. Additionally, the drill string component also comprises a male thread positioned on the pin end of the body. The male thread has a depth and a width. Each of the female thread and the male thread comprises a leading end. The leading end of each of the female thread and the male thread comprises a planar surface extending normal to the body. The planar surface of the leading end of the female thread extends along the entire width and the entire depth of the female thread. Similarly, the planar surface of the leading end of the male thread extends along the entire width and the entire depth of the male thread.

In addition to the foregoing, an implementation of a method of making a joint in a drill string with increased strength and without jamming or cross-threading involves inserting a pin end of a first drill string component into a box end of a second drill string component. The method also involves rotating the first drill sting component relative to the second drill string component; thereby abutting a planar leading end of a male thread on the pin end of the first drill string component against a planar leading end of a female thread on the box end of the second drill string component. The planar leading end of the male thread is oriented at an acute angle relative to a central axis of the first drill string component. Similarly, the planar leading end of the female thread is oriented at an acute angle relative to a central axis of the second drill string component. Additionally, the method involves sliding the planar leading end of the male thread against and along the planar leading end of the female thread to guide the male thread into a gap between turns of the female thread.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
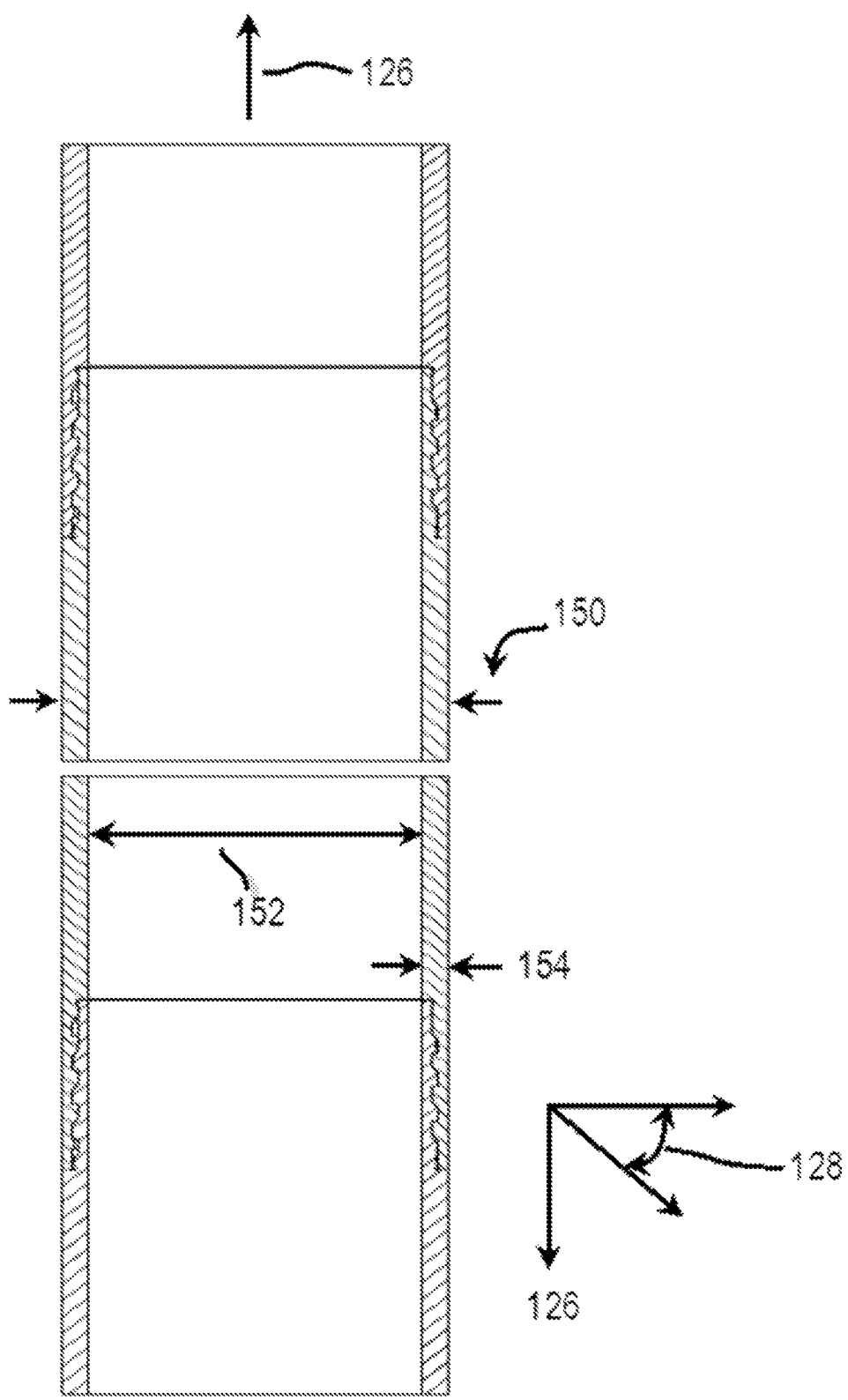
FIG. 1 illustrates fragmentary longitudinal sectional view through a plurality of connected drill rods in a drill string with a longitudinal intermediate portion of the drill rods being broken away.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Implementations of the present invention are directed toward drilling components, tools, and systems that provide for effective drill thread components and efficient making of threaded joints. For example, one or more implementations of the present invention comprise drill string components with increased load efficiency and load capacity, and that can also be resistant to wear, jamming and cross-threading. Such drill string components can reduce or eliminate damage to threads due to wear, jamming and cross-threading while also increasing the load efficiency and load capacity over conventional drilling components. In particular, one or more implementations comprise drill string components having multiple threads with leading ends or thread starts oriented at an acute angle relative to the central axis of the drill string component. Additionally or alternatively, the leading end of the thread can provide an abrupt transition to full thread depth and/or width. Furthermore, one or more implementations of drill string components operable to provide a progressive fit and that conserve cross-sectional material comprise at least one of varying thread width to provide a progressive fit in an axial direction over at least a portion of the thread and tapering at least one of the mating thread crests over at least a portion of the thread while maintaining a constant root diameter over the entire thread.

Reference will now be made to the drawings to describe various aspects of one or more implementations of the invention. It is to be understood that the drawings are diagrammatic and schematic representations of one or more implementations, and are not limiting of the present disclosure. Moreover, while various drawings are provided at a scale that is considered functional for one or more implementations, the drawings are not necessarily drawn to scale for all contemplated implementations. The drawings thus represent an exemplary scale, but no inference should be drawn from the drawings as to any required scale.

In the following description, numerous specific details are set forth in order to provide a thorough understanding of the present invention. It will be obvious, however, to one skilled in the art that the present disclosure may be practiced without these specific details. In other instances, well-known aspects of thread specifications, thread manufacturing, in-field equipment for connecting threaded components, and the like have not been described in particular detail in order to avoid unnecessarily obscuring aspects of the disclosed implementations.

Turning now to FIG. 1, an implementation of an exemplary threaded drill string component is illustrated. The threaded drill string components having increased load capacity and load efficiency that can also be joined while avoiding or reducing the risk of wear, cross-threading and jamming are described in particular detail below. As shown in FIGS. 1-4, a first drill string component 102 can comprise a body 103 and a male connector or pin end 104. A second drill string component 106 can comprise a body 107 and a female connector or box end 108. The pin end 104 of the first drill string component 106 can be configured to connect to the box end 108 of the second drill string component 106.

In one or more implementations, each drill string component 102, 106 can comprise a hollow body having a central axis 126 extending there through as shown in FIGS. 1-4. In these aspects, the hollow body can have a first end 134 and an opposing second end 136. In alternative implementations, one or more of the drill string components 102, 106 can comprise a solid body (such as a percussive drill rod or drill bit) or a partially hollow body. More particularly, in the case of a hollow body, the hollow body can comprise an inner diameter, an outer diameter and a wall thickness. On one exemplary aspect, the drill string component can have the following typical dimensions:

|  | Example 1 | Example 2 | Example 3 | Example 4 |
| --- | --- | --- | --- | --- |
| OD (in) | 2.20 | 2.75 | 3.50 | 4.50 |
| ID (in) | 1.91 | 2.38 | 3.06 | 4.0 |
| Wall Thickness (in) | 0.15 | 0.19 | 0.22 | 0.25 |
| Major Diameter (in) | 2.09 | 2.61 | 3.34 | 4.35 |

The pin end 104 can comprise at least one male thread 110 (i.e., a thread that projects radially outward from outer surface of the pin end 104). The box end 108, on the other hand, can comprise at least one female thread 112 (i.e., a thread that projects radially inward from an inner surface of the box end 108). The at least one male thread 110 and the at least one female thread 112 can have generally corresponding characteristics (e.g., width, height or depth, threaded length, taper, lead, pitch, threads per inch, number of thread starts, pitch diameter, mating thread turns, etc.) or they can vary in one or more of the enumerated characteristics.

In another aspect of the present invention, the following ranges and ratios are contemplated when determining the characteristics of drill string components of the present disclosure:

| Ranges/Ratios | Ex. 1 | Ex. 2 | Ex. 3 | Ex. 4 |
| --- | --- | --- | --- | --- |
| Wall thickness to outer diameter (%) | 7% | 6% | 6% | 7% |
| Thread depth to wall thickness (%) | 19% | 16% | 21% | 16% |
| Range of joint taper (deg) | 0.8 | 1.0 | 1.0 | 0.5 |
| Range of flank angle (deg) | −10 | 15 | 2 | −20 |
| Threaded length to diameter (%) | 55% | 39% | 44% | 43% |
| Range of thread pitch (tpi) | 3.50 | 3.00 | 2.50 | 1.75 |
| Major diameter less inner diameter, to wall thickness | 62% | 62% | 70% | 63% |
| Shoulder thickness to wall thickness (%) | 38% | 38% | 30% | 37% |

In one or more implementations, the at least one male thread 110 and at least one female thread 112 can comprise straight thread crests and roots. In a further implementation, at least one of the crests of the at least one male thread and at least one female thread 110, 112 are tapered while the thread roots of the threads 110, 112 remain constant. In another aspect, it is not necessary that threads 110, 112 be uniform along their entire length. Indeed, the at least one male thread 110 may have characteristics corresponding to those of the at least one female thread 112 despite the characteristics changing along the respective lengths of pin end 104 or box end 108. In one or more implementations, the at least one male and at least one female threads 110, 112 can have a variable thread pitch over at least a portion of the threads 110, 112. In other additional or alternate implementations, the at least one male and the at least one female threads 110, 112 can have a constant pitch as measured between thread at least one thread feature and a variable thread width over at least a portion of the threads 110, 112. In further or alternate implementations, at least one of the crests of the at least one male thread and at least one female thread 110, 112 are tapered over a desired portion of the length of the threads 110, 112 while the thread roots of the threads 110, 112 remain constant.

In one or more implementations, the male and female threads 110, 112 can comprise characteristics the same as or similar to those described in U.S. Pat. No. 5,788,401, the entire contents of which are incorporated by reference herein. For example, in one or more implementations, the male and female threads 110, 112 have a crest, a root, a pressure flank 137 and a clearance flank 139. According to one aspect, threads 110, 112 can have a pressure flank angle (or thread load flank angle) that can be from about −30 to about 15 degrees; more particularly, from about −20 to about −10 degrees; and, most particularly, about −20 to about −15 degrees, all measured relative to a plane perpendicular to the drill string central axis. As one skilled in the art will appreciate in light of the present disclosure, such negative pressure flank angles can aid in maintaining the joint in a coupled condition, even under overload and also reduce overall stress as compared to positive flank angles.

In another aspect, the box end and pin end of the drill sting component can have shoulders tapered at about 0 to about 15 degrees. In another aspect, the shoulders can have an outer diameter thickness of about 0.055 to about 0.080 inches; and more particularly, about 0.055 inches, about 0.083 inches, about 0.070 inches or about 0.075 inches.

In other aspects, the critical pin section thickness, or the target material thickness under the pin thread, can be used as an indicator of ultimate tensile strength and the stress amplification resulting from cutting the thread. In one aspect, the critical pin section thickness can be from about 40% to about 50% of wall thickness; and more particularly about 44%, about 45%, about 46% or about 47% of the wall thickness.

In other aspects, the critical box shoulder stiffness, or the section modulus or 'modulus of intertia' of the box shoulder, can contribute torsion strength and can be exponentially sensitive to shoulder thickness. In one aspect, the critical box shoulder stiffness can be from about 34% to about 48% of the tubing stiffness; more preferably, about 40%, about 41%, or about 43% of the tubing stiffness.

One will appreciate in light of the disclosure herein the foregoing description is just one configuration for the male and female threads 110, 112. In alternative implementations, the configuration of the male and female threads 110, 112 can differ from the forgoing description. In certain alternative implementations, the threads 110, 112 can also have negative pressure flank angles of about 5 to 30 degrees relative to a plane perpendicular to the drill string central axis and clearance flanks of an angle of at least 45 degrees to aid in maintaining the joint in a coupled condition, even under overload, and facilitate joint make up. Also, the box end and pin end can have shoulders tapered at about 5 to 20 degrees.

In another aspect, the flank angle can be characterized by a flank angle radial load expansion which describes the radial load created by the load flank angle that must be absorbed in the joint. As one skilled in the art will appreciate in light of the present disclosure, values of flank angle radial load expansion can be bounded by flank angles that cause excessive thread stress. Radial loads can be defined as the percentage of axial load applied to the thread flank or to the joint determined by the flank angle. Specifically, the radial load created is equal to the axial load multiplied by the tangent of the flank angle. As one skilled in the art will also appreciate in light of the present disclosure, positive values of radial load can cause unwanted expansion while negative values can provide beneficial contraction. Contraction is beneficial because it can reduce overall or Von Mises total stress levels, and it can increase the contract pressure between mating threads which increases friction and the torsion load transferred to the joint. However, the beneficial contraction due to negative values of radial load can become undesirable past a certain threshold. Here, the flank angle radial load expansion can be from about −18% to about −36%; more particularly, from about −18% to about −36%; and even more particularly, about −27%.

Figure 2:
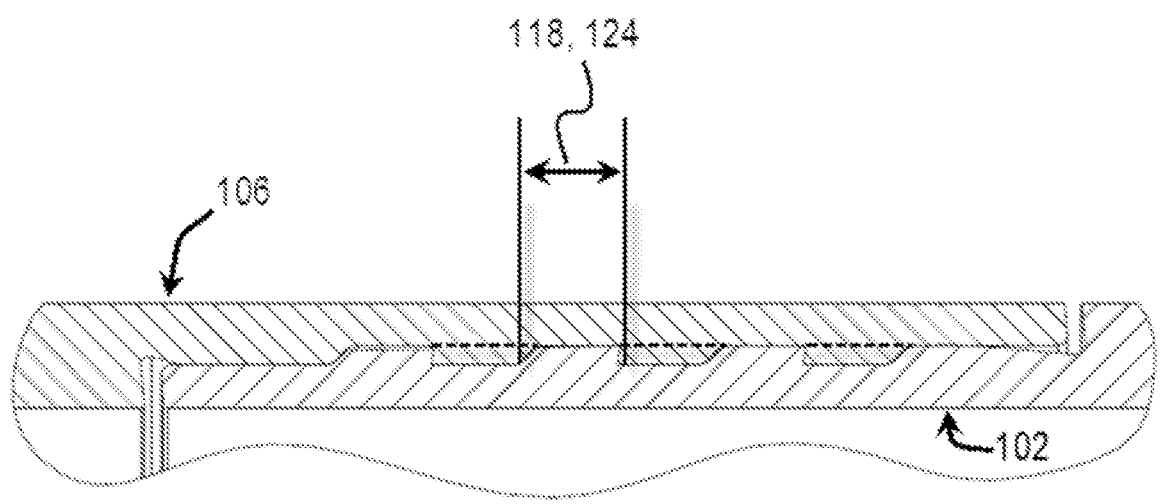
FIG. 2 is an enlarged fragmentary longitudinal sectional view of one of the drill rod joints of FIG. 1, the dotted lines indicating the location of the crests and roots of threads diametrically opposite those shown in solid lines and the joint being shown in a hand tight condition.
Figure 3:
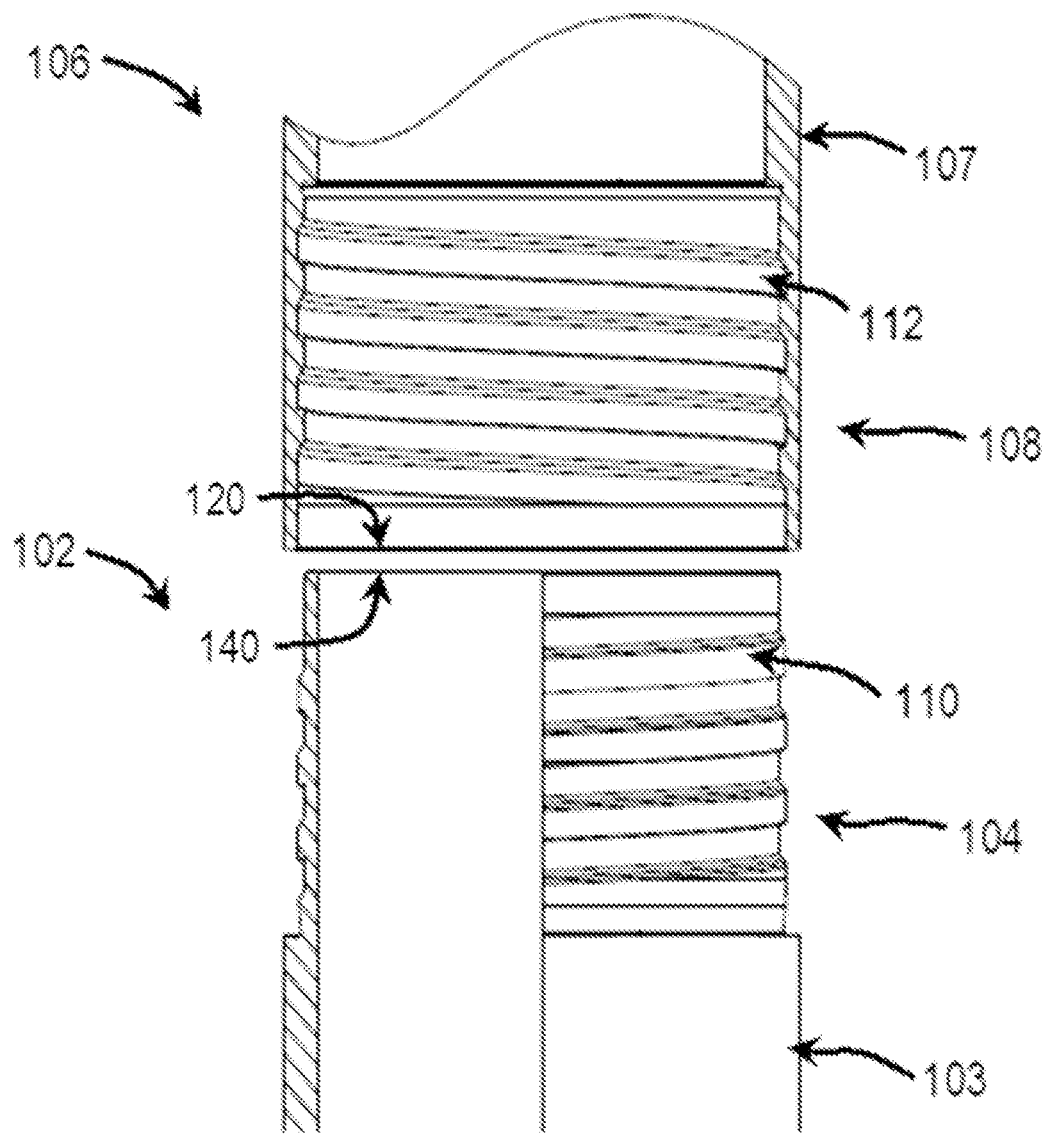
FIG. 3 is a fragmentary longitudinal view of a pin end of a drill rod oriented axially with the box end of an adjacent drill rod with the box and one half of the pin being shown in cross-section.
Figure 4:
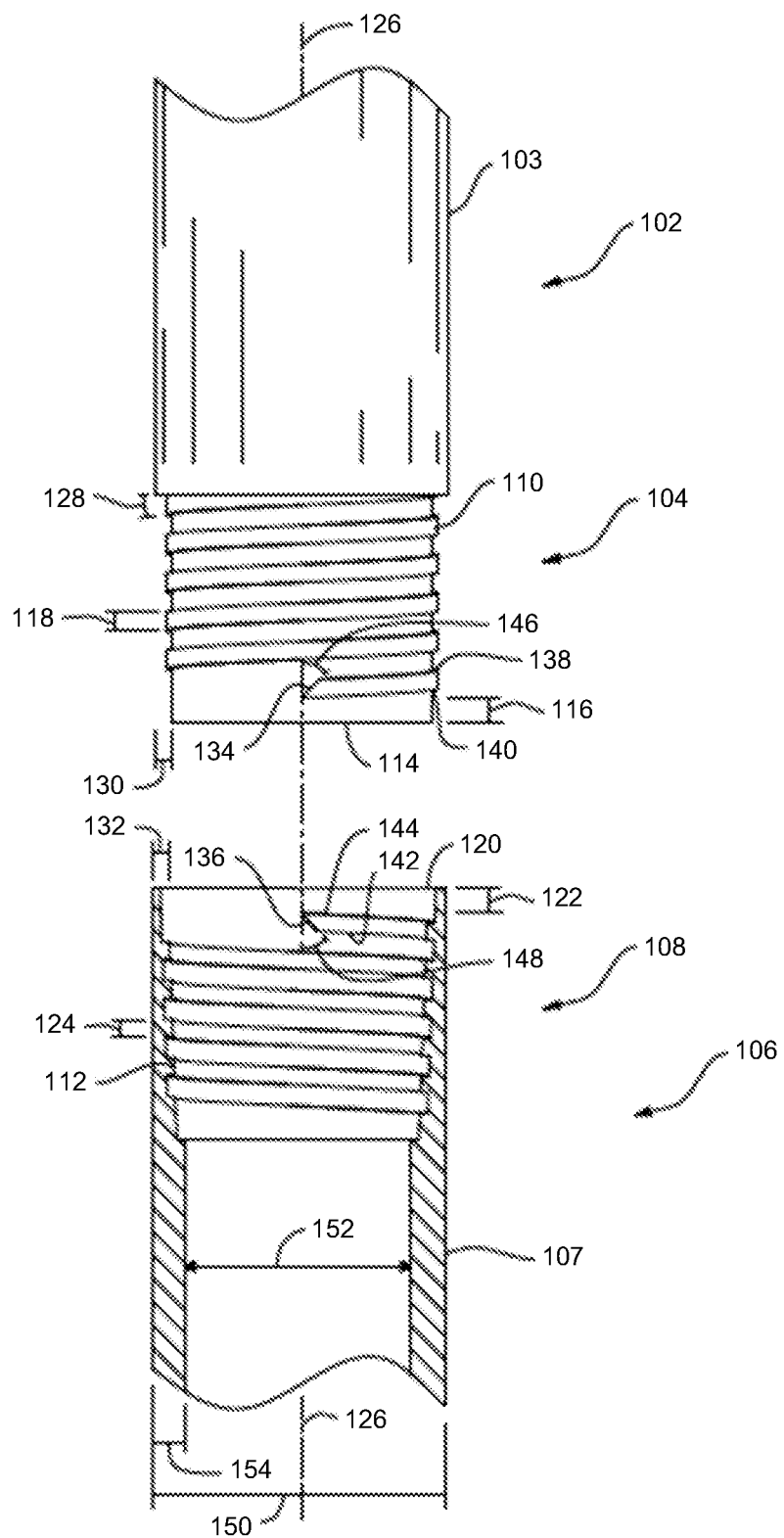
FIG. 4 illustrates a side view of a male end of a drill string component and a cross-sectional view of a female end of another drill string component each having a thread with a leading end in accordance with one or more implementations of the present invention.

The male thread 110 can begin proximate a leading edge 140 of the pin end 104. For example, FIG. 1-3 illustrate that the male thread 110 can be offset a distance (shown has a linear distance 116) from the leading edge 140 of the pin end 104. The offset distance can allow for an un-mated shoulder portion of a threaded member to be elastically compressed under torque applied during joint make-up. As one skilled in the art will appreciate, a resulting joint can maintain a pre-loaded condition given an applied make-up torque wherein a sufficient amount of offset distance can be required to allow thread travel and can allow a "pre-load" to build as the shoulder undergoes elastic compression. This "pre-load" can be required to maintain the joint in a closed condition while under large drilling tension loads or deviation bending loads that could otherwise cause the shoulder interface to open, thus increasing the bending load on the pin and creating the potential for the pin end to undergo fatigue failure. Accordingly, in various aspects, the offset distance 116 may vary as desired, and can particularly be different based on the size of the drill string component 102, configuration of the thread 110, or based on other factors. In at least one implementation, the offset distance 116 is between about one-half and about twice the width 118 of the male thread 110. Alternatively, the offset distance 116 may be greater or lesser. For example, in one or more implementations the offset distance 116 is zero such that the male thread 110 begins at the leading edge 140 of the pin end 104.

Similarly, female thread 112 can begin proximate a leading edge 120 of the box end 108. For example, FIGS. 1-4 illustrate that the female thread 112 can be offset a distance (shown has a linear distance 122) from the leading edge 120 of the box end 108. The offset distance 122 may vary as desired, and can particularly be different based on the size of the drill string component 106, configuration of the female thread 112, or based on other factors. In at least one implementation, the offset distance 122 is between about one-half and about twice the width 124 of the female thread 112. Alternatively, the offset distance 122 may be greater or lesser. For example, in one or more implementations the offset distance 122 is zero such that the female thread 112 begins at the leading edge 120 of the box end 108.

Furthermore, the offset distance 116 can be equal to the offset distance 122 as shown in FIGS. 1-4. In alternative implementations, the offset distance 122 may be greater or smaller than the offset distance 116. In any event, as the leading edge 140 of the pin end 104 is inserted into the box end 108 and rotated, the male thread 110 may engage the female thread 112, and the pin end 104 may advance linearly along a central axis 126 of the box end 108.

More particularly, the male and female threads 110, 112 can be helically disposed relative to the respective pin and box ends 104, 108. In other words, each of the male thread 110 and the female thread 112 can comprise a plurality of helical turns extending along the respective drill string component 102, 106. As the male and female threads 110, 112 mate, the threads may therefore rotate relative to each other and fit within gaps between corresponding threads. In FIGS. 1-4, the male thread 110 generally winds around pin end 104 at an angle 128, which can also be measured relative to the leading edge 140 of the pin end 104.

Multiple Thread Starts

One or more implementations of the present invention comprise drill string components having a plurality of threads. For example, in one or more implementations, the drill string component comprises at least two threads having respective thread starts that are, optionally, evenly spaced about the leading end of the drill string component.

In one aspect, use of multiple threads can increase the thread load flank bearing surface area and can result in a greater overall load efficiency when pin and box components are joined together. In one example, use of two threads doubles the thread bearing area as compared to a single thread when all other thread characteristics are held constant.

In another aspect, use of multiple threads can also increase the thread flank-to-thread root interface material and, correspondingly, the fatigue strength of the drill component. Without wishing to be bound by theory and/or simulation, the thread flank-to-thread root interface is the location of maximum stress and for fatigue failure crack initiation in drill string component joints. It follows that, all other things held constant, use of multiple threads can increase the fatigue strength of the drill component since the available material fatigue strength is reduced by the mean load as illustrated by a standard Modified Goodman Fatigue Diagram.

In a further aspect, use of multiple threads spaced equally about the respective leading ends of drill string components can increase the load capacity of drill string components placed in mating contact by creating a symmetrical load response about the central axis of the component.

On the other hand, the thread lead angle can increase as the thread pitch decreases and the number of threads is increased. Increasing the thread lead angle past an optimal angle can decrease the break-out torque requirement such that mating drill string components could disassemble in use. In another aspect, individual thread width and, correspondingly, load shear area can decrease as the number of threads on a given drill component increase, ultimately leading to thread shear overload failure.

In one embodiment, a number of threads that increases the load efficiency, load capacity and fatigue strength of the drill string component while maintaining acceptable thread lead angles and shear area for a drill string component of given dimensions can be determined to be the maximum number of threads possible where the thread width is not less than the thread height. In another embodiment, this disclosure provides for drill string components having at least two threads, and, preferably from about two to about four threads, operable to increase the load efficiency, load capacity and fatigue strength of the drill string components while maintaining acceptable thread lead angles and shear area over conventional single-thread drill string components.

Figure 7A:
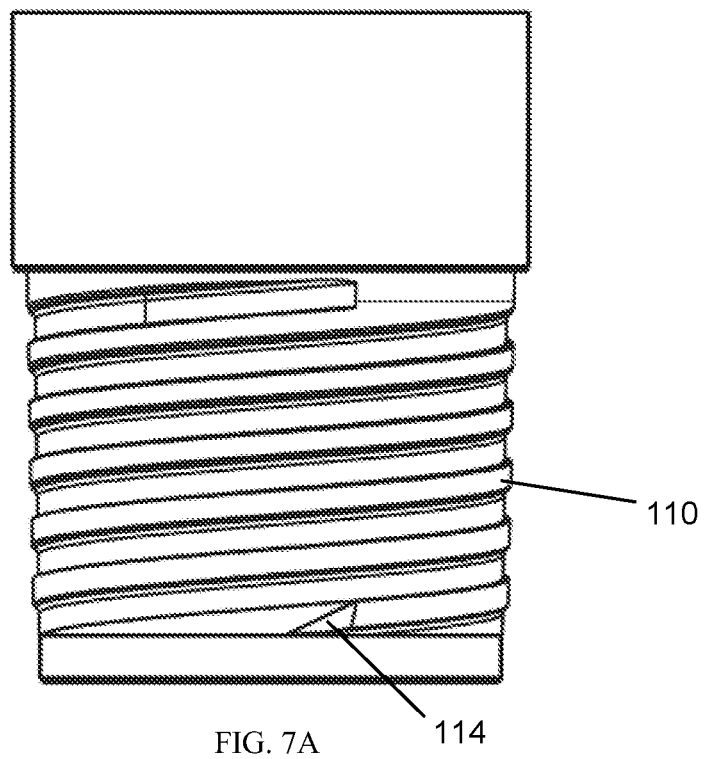
FIGS. 7A-7B depict respective left- and right-side views of an exemplary drill string component having male threads with respective leading ends that are circumferentially spaced 180 degrees apart and positioned on opposing sides of the drill string component as further disclosed herein.
Figure 7B:
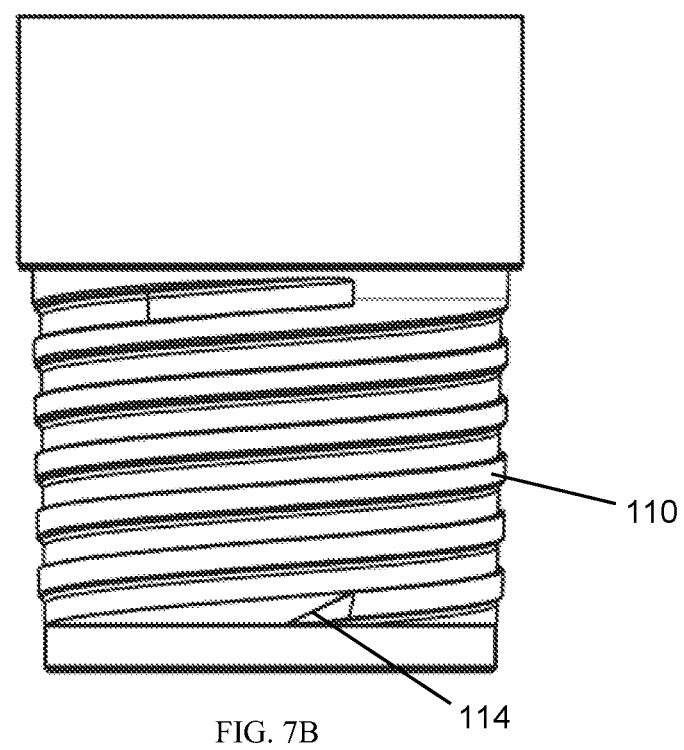
Figure 7C:
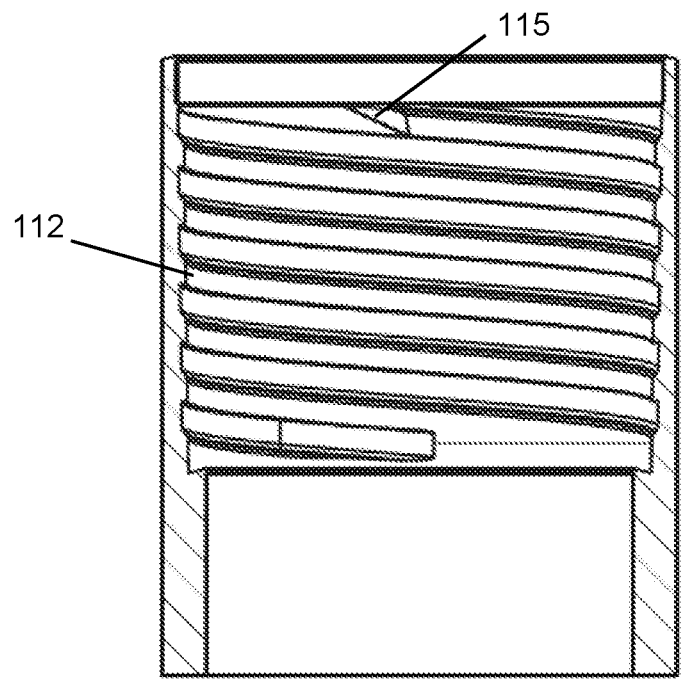
FIGS. 7C-7D depict respective left- and right-side views an exemplary drill string component having female threads with respective leading ends that are circumferentially spaced 180 degrees apart and positioned on opposing sides of the drill string component as further disclosed herein.
Figure 7D:
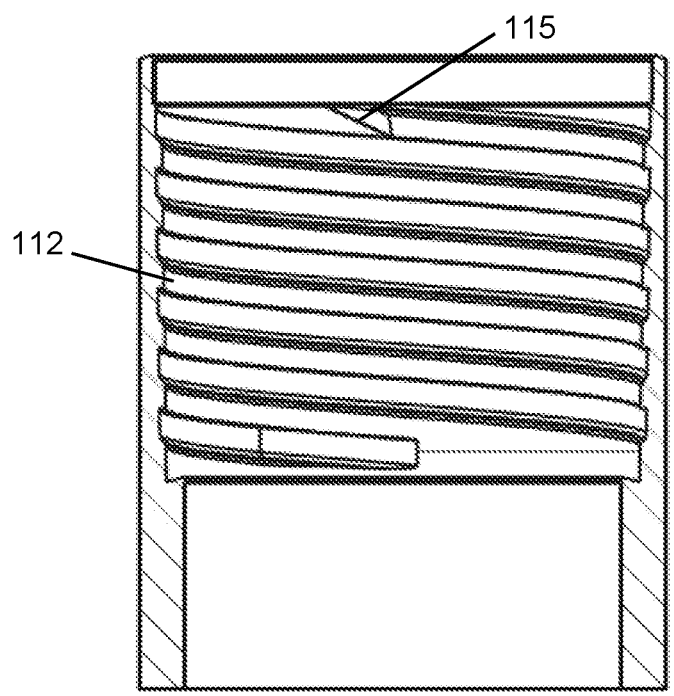
Figure 7E:
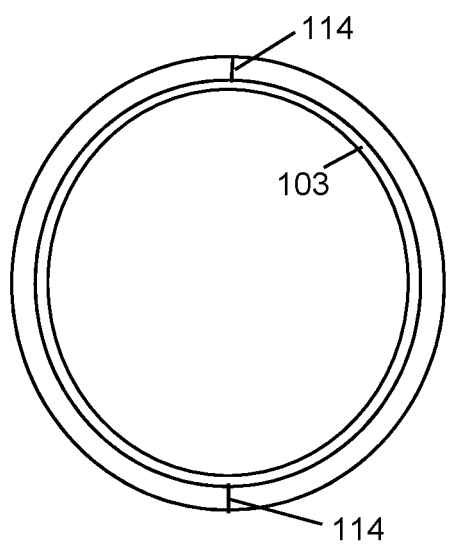
FIG. 7E is an end view of the drill string component of FIGS. 7A-7B, depicting the 180 degree spacing of the two leading ends of the male threads.
Figure 8:
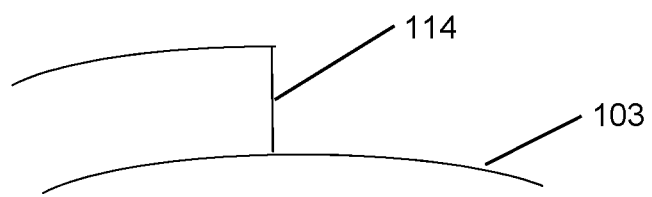
FIG. 8 is a schematic drawing depicting a leading end of a male thread extending normal to the hollow body of a drill string component as disclosed herein.
Figure 9:
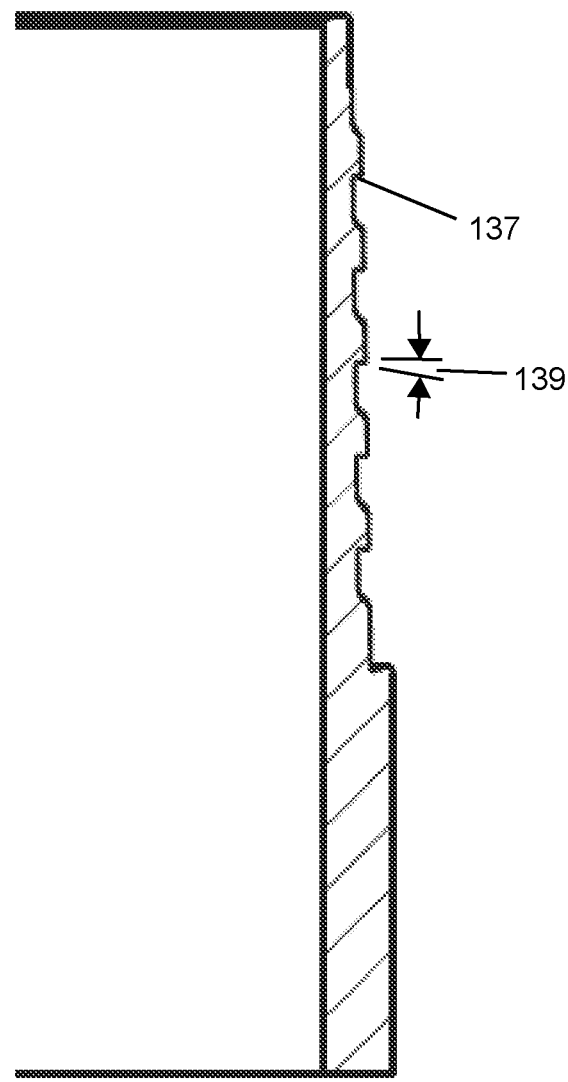
FIG. 9 is a close-up view of a pressure flank of a male thread as disclosed herein.

In one example, at least two male threads 110 can begin proximate to a leading edge 140 of pin end 104. In a further aspect, the at least two male threads can be spaced equally about a leading edge 140 of pin end 104. For example, as shown in FIGS. 7A-7B, it is contemplated that a pin end has two male threads having thread starts spaced about 180 degrees apart and proximate to a leading edge 140 of pin end 104. In another example, it is contemplated that a pin end has three male threads, having thread starts that can be spaced about 120 degrees apart and proximate to a leading edge 140 of pin end 104.

Similarly, at least two female threads 112 can begin proximate to a leading edge 140 of box end 108. In a further aspect, the at least two female threads can be spaced equally about a leading edge 120 of box end 108. For example, as shown in FIGS. 7A-7B, it is contemplated that a box end 108 has two female threads 112 having thread starts spaced about 180 degrees apart and proximate to a leading edge 120 of box end 108. In another example, it is contemplated that a box end 108 has three female threads 112 having thread starts that can be spaced about 120 degrees apart and proximate to a leading edge 120 of box end 108.

More particularly, at least two male threads 110 and at least two female threads 112 can be helically disposed relative to the respective pin and box ends 104, 108. In other words, each of the male threads 110 and each of the female threads 112 can comprise a plurality of helical turns extending along the respective drill string component 102, 106. Each of the male threads 110 and each of the female threads 112 can each comprise leading ends oriented at an acute angle relative to and equally spaced about the central axis of the respective drill string component 102, 106. As the at least two male threads 110 and the at least two female threads 112 mate, the threads may therefore rotate relative to each other and fit within gaps between corresponding threads and eventually form a drill string joint. Accordingly, in one or more embodiments, a drill string joint is formed having increased load efficiency, load capacity, and fatigue strength while maintaining acceptable thread lead angles and shear area for a given diameter drill string component Optimal Material Cross-Sections for Maximum Load Capacity One or more implementations of the present invention comprise drill string components that substantially eliminate overall root and thread taper in favor of at least one of varying thread pitch, varying thread width, and tapering at least a portion of the thread crest while providing a uniform thread root. Another aspect of the present invention comprises drill string components that eliminate overall root and thread taper in favor of at least one of varying thread pitch, varying thread width and tapering at least a portion of the thread crest while providing a uniform thread root.

In one aspect, material typically lost to overall joint and thread taper is conserved by providing drill string components having at least one thread comprising a thread pitch that varies from a first value proximate the leading end over at least a portion of the axial length of the plurality of helical turns thereof to a final value at a desired point on the at least one thread thereby selectively enabling an axial progressive fit. In one aspect, the thread pitch can increase uniformly from the first value over at least the first turn to a final value over at least the final turn of the plurality of helical turns. In an alternative aspect, the thread pitch can increase non-uniformly from the first value to a final value over the full axial length of the plurality of helical turns. In a further aspect, the thread pitch can increase from the first value to a final value across a portion of the axial length of the plurality of helical turns and can remain constant thereafter. In yet another aspect, the at least one thread can have a pitch that varies from about 2.0 to 5.0 threads/inch, preferably from about 3 to about 4 threads/inch and, most preferably, from about 3 to about 3.5 threads/inch. In other aspects, the thread can have a varying pitch over at least one turn and, preferably, two turns of the thread. In alternative aspect, the thread can have a pitch that varies from the leading end to the trailing end of the thread.

In another aspect, material typically lost to overall joint and thread taper is conserved by providing drill string components having at least one thread comprising a thread pitch that is constant when measured from at least one given thread feature but whose width can vary from a first value proximate the leading end over at least a portion of the axial length of the plurality of helical turns thereof to a final value at a desired point on the at least one thread thereby selectively enabling an axial progressive fit. In one aspect, the thread width can increase uniformly from the first value over at least the first turn to a final value over at least the final turn of the plurality of helical turns. In an alternative aspect, the thread width can increase non-uniformly from the first value to a final value over the full axial length of the plurality of helical turns. In a further aspect, the thread pitch can increase from the first value to a final value across a portion of the axial length of the plurality of helical turns and can remain constant thereafter. In other aspects, the thread load flank can be held at a constant pitch while the lead flank increases. In alternative aspects, the thread lead flank can be held at a constant pitch while the pitch of the load flank increases. In yet other aspects, the mid-point of the thread can have a constant pitch while both flanks have a varying pitch. In even further aspects, the varying pitch of the load flank can be different from the varying pitch of the lead flank.

In yet another aspect, the at least one thread can have a width that varies from about 50% of full thread width proximate the leading end and increases to full thread width proximate the trailing end of the thread. In a further aspect, the at least one thread can have a width that varies from about 75% of full thread width proximate the leading end and increases to full thread width proximate the trailing end of the thread. In other aspects, the thread can have a varying width over at least one turn and, preferably, two turns of the thread. In alternative aspect, the thread can have a width that varies from the leading end to the trailing end of the thread. In one exemplary embodiment, a 2 tpi thread having a full width of ¼" proximate the trailing end can have a reduced width of about ⅛" at the leading end. As one skilled in the art will appreciate, the spacing between the adjacent turns of the at least one thread is largest at the leading end and provides additional axial clearance when starting threads.

In yet another aspect, material typically lost to overall joint and thread taper is conserved by providing drill string components having at least one thread comprising a root that circumscribes a cylindrical surface extending over the full axial length of the plurality of helical turns of the thread and a crest that circumscribes a frusta-conical surface extending over at least a portion of the axial length of the plurality of helical turns thereof, thereby selectively enabling a radial progressive fit. The generatrix of the frusta-conical surface is a straight line having an angle relative to the central axis of the hollow body. In one aspect, the crest circumscribes a frusta-conical surface over the full axial length of the plurality of helical turns. In another aspect, the at least one thread can have a frusta-conical crest over at least a portion of the axial length of the at least one thread with the generatrix of the frusta-cone having an angle of about 0.75 to 1.6 degrees while the at least one thread can have cylindrical roots. In another aspect, the crest circumscribes a frusta-conical surface extending the axial length of at least one turn of the thread and, preferably at least two turns of the thread. In alternative aspects, the axial length can be substantially the full axial length of the thread.

In yet another aspect, material typically lost to overall joint and thread taper is conserved by providing drill string components having both at least one thread comprising a thread pitch that varies from a first value proximate the leading end over at least a portion of the axial length of the plurality of helical turns thereof to a final value at a desired point on the at least one thread, and further comprising a thread root that circumscribes a cylindrical surface extending over the full axial length of the plurality of helical turns and a thread crest that circumscribes a frusta-conical surface extending over at least a portion of the axial length of the plurality of helical turns thereof thereby selectively enabling both an axial progressive fit and a radial progressive fit.

In one example, at least one male thread 110 can begin proximate to a leading edge 140 of pin end 104. The at least one male thread 110 can comprise a plurality of helical turns extending along the respective length of pin end 104. In a further aspect, the at least one male thread can have a pitch that increases from a first value proximate the leading edge 140 over at least a portion of the axial length of the plurality of helical turns thereof to a final value at a desired point on the at least one male thread 110 and be held constant thereafter. In another aspect, the at least one male thread can have a pitch that increases from a first value proximate the leading edge 140 over the entire portion of the axial length of the plurality of helical turns thereof to a final value. In alternative aspects, the pitch can increase uniformly or non-uniformly across the axial length of the at least one male thread 110. For example, it is contemplated that a pin end has two male threads having a pitch that increases from the leading edge 140 of pin end 104 to a final value at a desired point along the axial length of the thread, such point being measured from the pin end 104.

Similarly, at least one female thread 112 can begin proximate to a leading edge 120 of box end 108. The at least one female thread 112 can comprise a plurality of helical turns extending along the respective length of box end 108. In a further aspect, the at least one female thread can have a pitch that increases from a first value proximate the leading edge 120 over at least a portion of the axial length of the plurality of helical turns thereof to a final value at a desired point on the at least one female thread 112 and be held constant thereafter. In another aspect, the at least one female thread can have a pitch that increases from a first value proximate the leading edge 120 over the entire portion of the axial length of the plurality of helical turns thereof to a final value. In alternative aspects, the pitch can increase uniformly or non-uniformly across the axial length of the at least one female thread 112. For example, it is contemplated that a pin end has two female threads having a pitch that increases from the leading edge 120 of box end 108 to a final value at a desired point along the axial length of the thread, such point being measured from the box end 108.

More particularly, at least one male thread 110 and at least one female thread 112 can be helically disposed relative to the respective pin and box ends 104, 108. In other words, the at least one male thread 110 and the at least one female thread 112 can comprise a plurality of helical turns extending along the respective drill string component 102, 106. The at least one male thread 110 and the at least one female thread 112 can each comprise leading ends 114, 115 oriented at an acute angle relative to and spaced about the central axis of the respective drill string component 102, 106. As the at least one male thread 110 and the at least one female thread 112 mate, the threads may therefore rotate relative to each other and fit within gaps between corresponding threads and eventually form a drill string joint. A progressive fit in the axial direction is selectively created between the respective pin and box ends 104, 108 as the pitch of at least one of the at least one male thread 110 and the at least one female thread 112 increases. Accordingly, in one or more embodiments, a drill string joint is formed having optimal material cross sections for maximum load capacity.

In another example, at least one male thread 110 can begin proximate to a leading edge 140 of pin end 104. The at least one male thread 110 can comprise a plurality of helical turns extending along the respective length of pin end 104 and can also have at least one thread feature with a constant pitch across the axial length of the thread. Exemplary thread features whose pitch can be held constant can include the load flank, the leading flank, the thread midpoint, and the like. In a further aspect, the at least one male thread can have a thread width that increases from a percentage of the full thread width proximate the leading edge 140 over at least a portion of the axial length of the plurality of helical turns thereof to the full thread width at a desired point on the at least one male thread 110 and be held constant thereafter. In another aspect, the at least one male thread can have a thread width that increases from a percentage of the full thread width proximate the leading edge 140 over the entire portion of the axial length of the plurality of helical turns thereof to the full thread width. In alternative aspects, the thread width can increase uniformly or non-uniformly across the axial length of the at least one male thread 110. For example, it is contemplated that a pin end has two male threads where at least one male thread has at least one feature having a constant pitch across the entire axial length of that thread and a width that increases from a percentage of full thread width at the leading edge 140 of pin end 104 to the full thread width at a desired point along the axial length of the thread.

Similarly, at least one female thread 112 can begin proximate to a leading edge 120 of box end 108. The at least one female thread 112 can comprise a plurality of helical turns extending along the respective length of box end 108 and can also have at least one thread feature with a constant pitch across the axial length of the thread. Exemplary thread features whose pitch can be held constant can include the load flank, the leading flank, the thread midpoint, and the like. In a further aspect, the at least one female thread can have a thread width that increases from a percentage of the full thread width proximate the leading edge 120 over at least a portion of the axial length of the plurality of helical turns thereof to the full thread width at a desired point on the at least one female thread 112 and be held constant thereafter. In another aspect, the at least one female thread can have a thread width that increases from a percentage of the full thread width proximate the leading edge 120 over the entire portion of the axial length of the plurality of helical turns thereof to the full thread width. In alternative aspects, the thread width can increase uniformly or non-uniformly across the axial length of the at least one female thread 112. For example, it is contemplated that a box end has two female threads where at least one female thread has at least one feature having a constant pitch across the entire axial length of that thread and a width that increases from a percentage of full thread width at the leading edge 120 of box end 108 to the full thread width at a desired point along the axial length of the thread.

More particularly, at least one male thread 110 and at least one female thread 112 can be helically disposed relative to the respective pin and box ends 104, 108. In other words, the at least one male thread 110 and the at least one female thread 112 can comprise a plurality of helical turns extending along the respective drill string component 102, 106. The at least one male thread 110 and the at least one female thread 112 can each comprise leading ends oriented at an acute angle relative to and spaced about the central axis of the respective drill string component 102, 106. As the at least one male thread 110 and the at least one female thread 112 mate, the threads may therefore rotate relative to each other and fit within gaps between corresponding threads and eventually form a drill string joint. A progressive fit in the axial direction is selectively created between the respective pin and box ends 104, 108 as the width of at least one of the at least one male thread 110 and the at least one female thread 112 increases while at least one feature of both the at least one male thread 110 and the at least one female thread 112 has a constant pitch across the axial length of the respective thread. Accordingly, in one or more embodiments, a drill string joint is formed having optimal material cross sections for maximum load capacity.

In another example, at least one male thread 110 can begin proximate to a leading edge 140 of pin end 104. The at least one male thread 110 can comprise a plurality of helical turns extending along the respective length of pin end 104. In one aspect, the at least one male thread 110 can have a thread root that circumscribes a cylindrical surface over the entire axial length of the plurality of helical turns. In a further aspect, the at least one male thread 110 can have a thread crest that circumscribes a frusta-conical surface from a first diameter proximate the leading edge 140 extending over at least a portion of the axial length of the plurality of helical turns thereof to a final diameter at a desired point on the at least one male thread 110 and be held constant thereafter. The generatrix of the frusta-conical surface is a straight line passing through the thread crests that lies at an angle relative to the central axis extending through the hollow body. In another aspect, the at least one male thread 110 can have a thread crest that circumscribes a frusta-conical surface from a first diameter proximate the leading edge 140 extending over the full axial length of the plurality of helical turns thereof to a final diameter. For example, it is contemplated that a pin end has at least one male thread having a thread crest that circumscribes a cylinder and a thread crest that circumscribes a frusta-conical surface from a first diameter proximate the leading edge 140 extending over at desired portion of the axial length of the plurality of helical turns thereof to a final diameter at a desired point on the at least one male thread 110 and held constant thereafter.

Similarly, at least one female thread 112 can begin proximate to a leading edge 120 of box end 108. The at least one female thread 112 can comprise a plurality of helical turns extending along the respective length of box end 108. In one aspect, the at least one female thread 112 can have a thread root that circumscribes a cylindrical surface over the entire axial length of the plurality of helical turns. In a further aspect, the at least one female thread 112 can have a thread crest that circumscribes a frusta-conical surface from a first diameter proximate the leading edge 120 extending over at least a portion of the axial length of the plurality of helical turns thereof to a final diameter at a desired point on the at least one female thread 112 and be held constant thereafter. The generatrix of the frusta-conical surface is a straight line passing through the thread crests that lies at an angle relative to the central axis extending through the hollow body. In another aspect, the at least one female thread 112 can have a thread crest that circumscribes a frusta-conical surface from a first diameter proximate the leading edge 120 extending over the full axial length of the plurality of helical turns thereof to a final diameter. For example, it is contemplated that a box end 108 has at least one female thread 112 having a thread crest that circumscribes a cylinder and a thread crest that circumscribes a frusta-conical surface from a first diameter proximate the leading edge 120 extending over at desired portion of the axial length of the plurality of helical turns thereof to a final diameter at a desired point on the at least one female thread 112 and held constant thereafter.

More particularly, at least one male thread 110 and at least one female thread 112 can be helically disposed relative to the respective pin and box ends 104, 108. In other words, the at least one male thread 110 and the at least one female thread 112 can comprise a plurality of helical turns extending along the respective drill string component 102, 106. The at least one male thread 110 and the at least one female thread 112 can each comprise leading ends oriented at an acute angle relative to the central axis of the respective drill string component 102, 106. In one aspect, both the at least one male thread 110 and the at least one female thread 112 can have a thread root that circumscribes a cylindrical surface over the entire axial length of the plurality of helical turns. In a further aspect, at least one of the at least one male thread 110 and the at least one female thread 112 can have a thread crest that circumscribes a frusta-conical surface from a first diameter proximate the leading edge extending over at least a portion of the axial length of the plurality of helical turns thereof to a final diameter at a desired point on the at least one female thread 112 and be held constant thereafter. As the at least one male thread 110 and the at least one female thread 112 mate, the threads may therefore rotate relative to each other and fit within gaps between corresponding threads and eventually form a drill string joint. A progressive fit in the radial direction is selectively created between the respective pin and box ends 104, 108 as the crest diameter of at least one of the at least one male thread 110 and the at least one female thread 112 increases. Accordingly, in one or more embodiments, a drill string joint is formed having optimal material cross sections for maximum load capacity.

In another example, at least one male thread 110 can begin proximate to a leading edge 140 of pin end 104. The at least one male thread 110 can comprise a plurality of helical turns extending along the respective length of pin end 104. In one aspect, the at least one male thread can have at least one of a pitch and a width that increases from a first value proximate the leading edge 140 over at least a portion of the axial length of the plurality of helical turns thereof to a final value at a desired point on the at least one male thread 110 and be held constant thereafter. In a further aspect, the at least one male thread 110 can have a thread root that circumscribes a cylindrical surface over the entire axial length of the plurality of helical turns. In yet a further aspect, the at least one male thread 110 can have a thread crest that circumscribes a frusta-conical surface from a first diameter proximate the leading edge 140 extending over at least a portion of the axial length of the plurality of helical turns thereof to a final diameter at a desired point on the at least one male thread 110 and be held constant thereafter. The generatrix of the frusta-conical surface is a straight line passing through the thread crests that lies at an angle relative to the central axis extending through the hollow body. In another aspect, the at least one male thread 110 can have a thread crest that circumscribes a frusta-conical surface from a first diameter proximate the leading edge 140 extending over the full axial length of the plurality of helical turns thereof to a final diameter. For example, it is contemplated that a pin end has at least one male thread having a thread crest that circumscribes a cylinder and a thread crest that circumscribes a frusta-conical surface from a first diameter proximate the leading edge 140 extending over at desired portion of the axial length of the plurality of helical turns thereof to a final diameter at a desired point on the at least one male thread 110 and held constant thereafter. The at least one male thread 110 also has at least one of a pitch and a width that increases from the leading edge 140 of pin end 104 to a final value at a desired point along the axial length of the thread, such point being measured from the pin end 104.

Similarly, at least one female thread 112 can begin proximate to a leading edge 120 of box end 108. The at least one female thread 112 can comprise a plurality of helical turns extending along the respective length of box end 108. In one aspect, the at least one male thread can have at least one of a pitch and a width that increases from a first value proximate the leading edge 120 over at least a portion of the axial length of the plurality of helical turns thereof to a final value at a desired point on the at least one female thread 112 and be held constant thereafter. In a further aspect, the at least one female thread 112 can have a thread root that circumscribes a cylindrical surface over the entire axial length of the plurality of helical turns. In yet a further aspect, the at least one female thread 112 can have a thread crest that circumscribes a frusta-conical surface from a first diameter proximate the leading edge 120 extending over at least a portion of the axial length of the plurality of helical turns thereof to a final diameter at a desired point on the at least one female thread 112 and be held constant thereafter. The generatrix of the frusta-conical surface is a straight line passing through the thread crests that lies at an angle relative to the central axis extending through the hollow body. In another aspect, the at least one female thread 112 can have a thread crest that circumscribes a frusta-conical surface from a first diameter proximate the leading edge 120 extending over the full axial length of the plurality of helical turns thereof to a final diameter. For example, it is contemplated that a box end 108 has at least one female thread 112 having a thread crest that circumscribes a cylinder and a thread crest that circumscribes a frusta-conical surface from a first diameter proximate the leading edge 120 extending over at desired portion of the axial length of the plurality of helical turns thereof to a final diameter at a desired point on the at least one female thread 112 and held constant thereafter. The at least one female thread 112 also has at least one of a pitch and a width that increases from the leading edge 120 of box end 108 to a final value at a desired point along the axial length of the thread, such point being measured from the box end 108.

More particularly, at least one male thread 110 and at least one female thread 112 can be helically disposed relative to the respective pin and box ends 104, 108. In other words, the at least one male thread 110 and the at least one female thread 112 can comprise a plurality of helical turns extending along the respective drill string component 102, 106. The at least one male thread 110 and the at least one female thread 112 can each comprise leading ends oriented at an acute angle relative to the central axis of the respective drill string component 102, 106. In one aspect, both the at least one male thread 110 and the at least one female thread 112 can have a thread root that circumscribes a cylindrical surface over the entire axial length of the plurality of helical turns. In a further aspect, at least one of the at least one male thread 110 and the at least one female thread 112 can have a thread crest that circumscribes a frusta-conical surface from a first diameter proximate the respective edge 140, 120 extending over at least a portion of the axial length of the plurality of helical turns thereof to a final diameter at a desired point on the respective at least one thread and be held constant thereafter. As the at least one male thread 110 and the at least one female thread 112 mate, the threads may therefore rotate relative to each other and fit within gaps between corresponding threads and eventually form a drill string joint. A progressive fit in the radial direction is selectively created between the respective pin and box ends 104, 108 as the crest diameter of at least one of the at least one male thread 110 and the at least one female thread 112 increases. Also, a progressive fit in the axial direction is selectively created between the respective pin and box ends 104, 108. As at least one of the pitch and the width of at least one of the at least one male thread 110 and the at least one female thread 112 increases. Accordingly, in one or more embodiments, a drill string joint is formed having optimal material cross sections for maximum load capacity.

Anti-Jamming Thread Starts

One or more implementations of the present invention comprise drill string components having threads whose respective leading ends are oriented at an acute angle relative to the central axis of the drill string component and, additionally or alternatively, the leading end of the thread can provide an abrupt transition to the full thread depth and/or width.

The male thread 110 can comprise a thread width 118 and the female thread 112 can comprise a thread width 124 as previously mentioned. As used herein the term "thread width" can comprise the linear distance between edges of a thread crest as measured along a line normal to the edges of the thread crest. One will appreciate that the thread widths 118, 124 can vary depending upon the configuration of the threads 110, 112. In one or more implementations, the thread width 118 of the male thread 110 is equal to the thread width 124 of the female thread 112. In alternative implementations, the thread width 118 of the male thread 110 is larger or smaller than the thread width 124 of the female thread 112.

The male thread 110 can comprise a thread depth 130 and the female thread 112 can comprise a thread depth 132. As used herein the term "thread depth" can comprise the linear distance from the surface from which the thread extends (i.e., the outer surface of the pin end 104 or inner surface of the box end 108) to most radially distal point on the thread crest as measured along a line normal to the surface from which the thread extends. One will appreciate that the thread depths 130, 132 can vary depending upon the configuration of the threads 110, 112 and/or the size of the drill string components 102, 106. In one or more implementations, the thread depth 130 of the male thread 110 is equal to the thread depth 132 of the female thread 112. In alternative implementations, the thread depth 130 of the male thread 110 is larger or smaller than the thread depth 132 of the female thread 112.

In one or more implementations, the thread width 118, 124 of each thread 110, 112 is greater than the thread depth 130, 132 of each thread 110, 112. For example, in one or more implementations, the thread width 118, 124 of each thread 110, 112 is at least two times the thread depth 130, 132 of each thread 110, 112. In alternative implementations, the thread width 118, 124 of each thread 110, 112 is approximately equal to or less than the thread depth 130, 132 of each thread 110, 112.

As alluded to above, both the male and female threads 110, 112 can comprise a leading end or thread start. For example, FIGS. 1-4 illustrate that the male thread 110 can comprise a thread start or leading end 114. Similarly, the female thread 112 can comprise a thread start or leading end 115.

In one or more implementations, the leading end 114 of the male thread 110 can comprise a planar surface that extends from the outer surface of the pin end 104. For example, the leading end 114 of the male thread 110 can comprise a planar surface that extends radially outward from the outer surface of the pin end 104, thereby forming a face surface. In one or more implementations the leading end 114 extends in a direction normal to the outer surface of the pin end 104. In alternative implementations, the leading end 114 extends in a direction substantially normal to the outer surface of the pin end 104 (i.e., in a direction oriented at an angle less than about 15 degrees to a direction normal to the outer surface of the pin end 104). In still further implementations, the leading end 114 can comprise a surface that curves along one or more of its height or width.

Furthermore, in one or more implementations the leading end 114 of the male thread 110 can extend the full thread width 118 of the male thread 110. In other words, the leading end 114 of the male thread 110 can extend from a leading edge 134 to a trailing edge 138 of the male thread 110. Thus, the planar surface forming the leading end 114 can span the entire thread width 118 of the male thread 110.

Additionally, in one or more implementations the leading end 114 of the male thread 110 can extend the full thread depth 130 of the male thread 110. In other words, a height of the leading end 114 of the male thread 110 can be equal to the thread depth 130. Thus, the planar surface forming the leading end 114 can span the entire thread depth 130 of the male thread 110. As such, the leading end 114 or thread start can comprise an abrupt transition to the full depth and/or width of the male thread 110. In other words, in one or more implementations, the male thread 110 does not comprise a tail end that tapers gradually to the full depth of the male thread 110.

Along similar lines, the leading end 115 of the female thread 112 can comprise a planar surface that extends from the inner surface of the box end 108. For example, the leading end 115 of the female thread 112 can comprise a planar surface that extends radially inward from the inner surface of the box end 108, thereby forming a face surface. In one or more implementations the leading end 115 extends in a direction normal to the inner and/or outer surface of the box end 108. In alternative implementations, the leading end 115 extends in a direction substantially normal to the inner or outer surface of the box end 108 (i.e., in a direction oriented at an angle less than about 15 degrees to a direction normal to the inner and/or outer surface of the box end 108). In still further implementations, the leading end 115 can comprise a surface that curves along one or more of its height or width. For example, the leading end 114 and the leading end 115 can comprise cooperating curved surfaces.

Furthermore, in one or more implementations the leading end 115 of the female thread 112 can extend the full thread width 124 of the female thread 112. In other words, the leading end 115 of the female thread 112 can extend from a leading edge 144 to a trailing edge 142 of the female thread 112. Thus, the planar surface forming the leading end 115 can span the entire thread width 124 of the female thread 112.

Additionally, in one or more implementations the leading end 115 of the female thread 112 can extend the full thread depth 132 of the female thread 112. In other words, a height of the leading end 115 of the female thread 112 can be equal to the thread depth 132. Thus, the planar surface forming the leading end 115 can span the entire thread depth 132 of the female thread 112. As such, the leading end or thread start 115 can comprise an abrupt transition to the full depth and/or width of the female thread 112. In other words, in one or more implementations, the female thread 112 does not comprise a tail end that tapers gradually to the full depth of the female thread 112. In the illustrated implementation, the leading end or thread start 115 of the female thread 112 is illustrated as being formed by material that remains after machining or another process used to form the threads. Thus, the leading end or thread start 115 may be, relative to the interior surface of the box end 108, embossed rather than recessed.

In one or more implementations, the leading end 114 of the male thread 110 can have a size and/or shape equal to the leading end 115 of the female thread 112. In alternative implementations, the size and/or shape of the leading end 114 of the male thread 110 can differ from the size and/or shape of the leading end 115 of the female thread 112. For example, in one or more implementations the leading end 114 of the male thread 110 can be larger than the leading end 115 of the female thread 112.

In one or more implementations, the leading ends 114, 115 of the male and female threads 110, 112 can each have an off-axis orientation. In other words, the planar surfaces of the leading ends 114, 115 of the male and female threads 110, 112 can each extend in a direction offset or non-parallel to a central axis 126 of the drill string components 102, 106. For example, as illustrated by FIGS. 1-4, the planar surface of the leading end 114 of the male thread 110 can face an adjacent turn of the male thread 110. Similarly, planar surface of the leading end 115 of the female thread 112 can face an adjacent turn of the female thread 112.

More particularly, the planar surface of the leading end 114 of the male thread 110 can extend at an angle relative to the leading edge 140 or the central axis 126 of the pin end 104. For instance, in FIGS. 1-4, the planar surface of the leading end 114 of the male thread 110 is oriented at an angle 146 relative to the central axis 126 of the drill string component 102, although the angle may also be measured relative to the leading edge 140. The illustrated orientation and existence of a planar surface of the leading end 114 is particularly noticeable when compared to traditional threads, which taper to a point such that there is virtually no distance between the leading and trailing edges of a thread, thereby providing no face surface.

Similar to the leading end 114, the leading end 115 of the female thread 112 can extend at an angle relative to the leading edge 120 or the central axis 126 of the box end 108. For instance, in FIGS. 1-4, the planar surface of the leading end 115 of the female thread 112 is oriented at an angle 148 relative to the central axis 126 of the drill string component 106, although the angle may also be measured relative to the leading edge 120.

The angles 146, 148 can be varied in accordance with the present disclosure and comprise any number of different angles. The angles 146, 148 may be varied based on other characteristics of the threads 110, 112, or based on a value that is independent of thread characteristics. In one or more implementations, angle 146 is equal to angle 148. In alternative implementations, the angle 146 can differ from angle 148.

In one or more implementations the angles 146, 148 are each acute angles. For example, each of the angles 146, 148 can comprise an angle between about 10 degrees and 80 degrees, about 15 degrees and about 75 degrees, about 20 degrees and about 70 degrees, about 30 degrees and about 60 degrees, about 40 degrees and about 50 degrees. In further implementations, the angles 146, 148 can comprise about 45 degrees. One will appreciate in light of the disclosure herein that upon impact between two mating leading ends 114, 115 or start faces with increasing angles 146, 148, there is decreasing loss of momentum and decreasing frictional resistance to drawing the threads 110, 112 into a fully mating condition. In any event, a leading end 114 of the male thread 110 can mate with the leading end 115 of the female thread 112 to aid in making a joint between the first drill string component 102 and the second drill string component 106.

By eliminating the long tail of a thread start and replacing the tail with a more abrupt transition to the full height of the thread 110, 112, a leading ends 114, 115 or thread start face can thus be provided. Moreover, while the leading ends 114, 115 may be angled or otherwise oriented with respect to an axis 126, the thread start face may also be normal to the major and/or minor diameters of cylindrical surfaces of the corresponding pin and box ends 104, 108. Such geometry eliminates a tail-type thread start that can act as a wedge, thereby eliminating geometry that leads to wedging upon mating of the pin and box ends 104, 108.

Moreover, as the pin and box ends 104, 108 are drawn together, the leading ends 114, 115 or thread starts may have corresponding surfaces that, when mated together, create a sliding interface in a near thread-coupled condition. For instance, where the leading ends 114, 115 are each oriented at acute angles, the leading ends 114, 115 or thread start faces may engage each other and cooperatively draw threads into a fully thread-coupled condition. By way of example during make up of a drill rod assembly, as the pin end 104 is fed into the box end 108, the leading ends 114, 115 can engage and direct each other into corresponding recesses between threads. Such may occur during rotation and feed of one or both of the drill string components 102, 106. Furthermore, since thread start tails are eliminated, there are few—if any—limits on rotational positions for mating. Thus, the pin and box ends 104, 108 can have the full circumference available for mating, with no jamming prone positions.

In one or more implementations, a thread 110 may be formed with a tail using conventional machining processes. The tail may be least partially removed to form the leading end 114. In such implementations, a tail may extend around approximately half the circumference of a given pin end 104. Consequently, if the entire tail of the thread 110 is removed, the thread 110 may have a leading end 114 aligned with the axis 126. If, however, more of the thread 110 beyond just the tail is removed, leading end 114 may be offset relative to the axis 126. The tail may be removed by a separate machining process. Although this example illustrates the removal of a tail for formation of a thread start, in other embodiments a thread start face may be formed in the absence of creation and/or subsequent removal of a tail-type thread start. For example, instead of using conventional machining processes, the thread is formed using electrical discharge machining. Electrical discharge machining can allow for the formation of the leading end 114 since metal can be consumed during the process. Alternatively, electrochemical machining or other processes that consume material may also be used to form the leading ends 114, 115 of the threads 110, 112.

Optimal Interference Fit

One or more implementations of the present invention comprise eliminating interference fits on thread features and, optionally, relocating the interference fit to other joint features such as radially mating shoulder surfaces. In one aspect, male and female threads 110, 112 can have relative depths such that the male thread crest maintains a radially spaced relationship with the mating female root while the female thread crest meets the male thread root. In another aspect, the male and female threads 110, 112 can have relative depths such that the female thread crest maintains a radially spaced relationship with the mating male thread root while the female thread crest meets the male thread root. In another aspect, male and female threads 110, 112 can have relative depths such that the male thread crest maintains a radially spaced relationship with the mating female root and the female thread crest maintains a radially spaced relationship with the mating male thread root. In one aspect, the radial spacing between mating thread crests and roots can be from about 0.001 to about 0.010 inches, more particularly from about 0.003 to about 0.007 inches and, most preferably about 0.005 inches. In an alternative aspect, the radial spacing between mating thread crests can be from about 1% to about 5%, more particularly from about 1.5% to about 3%, and most particularly from about 2% to about 2.5% of the wall thickness of a hollow body.

As previously mentioned, in one or more implementations the drill string components 102, 106 can comprise hollow bodies. More specifically, in one or more implementations the drill string components can be thin-walled. In particular, as shown by FIGS. 1-4, the drill string component 106 can comprise an outer diameter 150, an inner diameter 152, and a wall thickness 154. The wall thickness 154 can equal one half of the outer diameter 150 minus the inner diameter 152. In one or more implementations, the drill string component 106 has a wall thickness 154 between about approximately 5 percent and 15 percent of the outer diameter 150. In further implementations, the drill string component 106 has a wall thickness 154 between about approximately 6 percent and 8 percent of the outer diameter 150. One will appreciate that such thin-walled drill string components can limit the geometry of the threads 112. However, a thin-walled drill string component can nonetheless comprise any combination of features discussed hereinabove despite such limitations.

Figure 5:
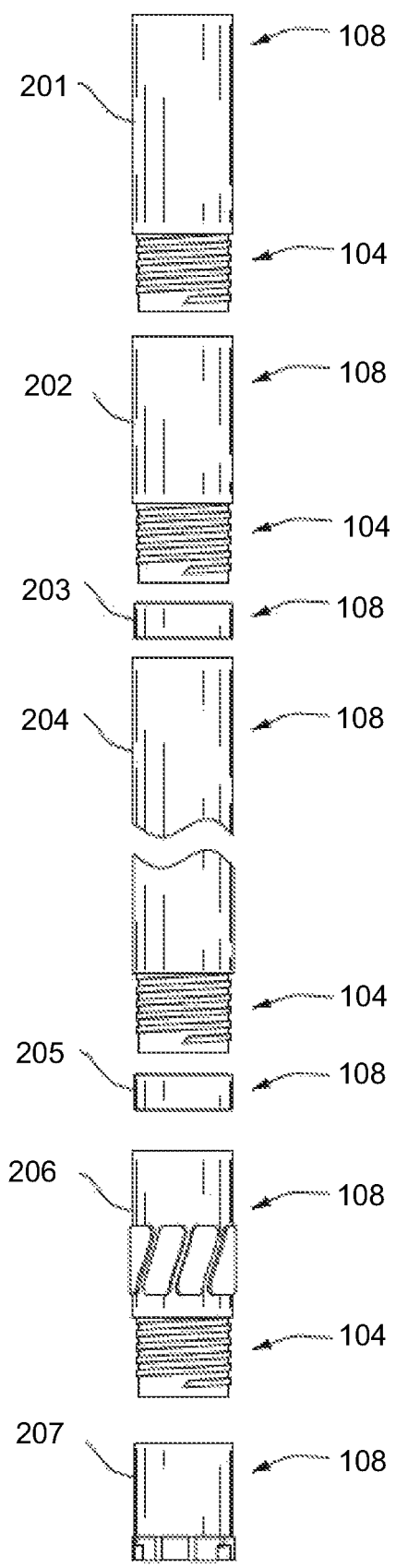
FIG. 5 illustrates a side view of an exploded drill string having drill string components having leading ends in accordance with one or more implementations of the present invention.

Referring now to FIG. 5, the drill string components 102, 106 can comprise any number of different types of tools. In other words, virtually any threaded member used on a drill string can comprise one or more of a box end 108 and a pin end 104 having leading ends or thread starts as described in relation to FIGS. 1-4. For example, FIG. 5 illustrates that drill string components can comprise a locking coupling 201, an adaptor coupling 202, a drill rod 204, and a reamer 206 can each comprise both a pin end 104 and a box end 108 with leading ends 114, 115 having increased load efficiency and load capacity, and that can also be resistant to wear, jamming and cross-threading as described above in relation to FIGS. 1-4. FIG. 5 further illustrates that drill string components can comprise a stabilizer 203, a landing ring 205 and a drill bit 207 including a box end 108 with a leading end 115 having increased load efficiency and load capacity, and that can also be resistant to wear, jamming and cross-threading as described above in relation to FIGS. 1-4. In yet further implementations, the drill string components 102, 106 can comprise casings, reamers, core lifters, or other drill string components.

Figure 6:
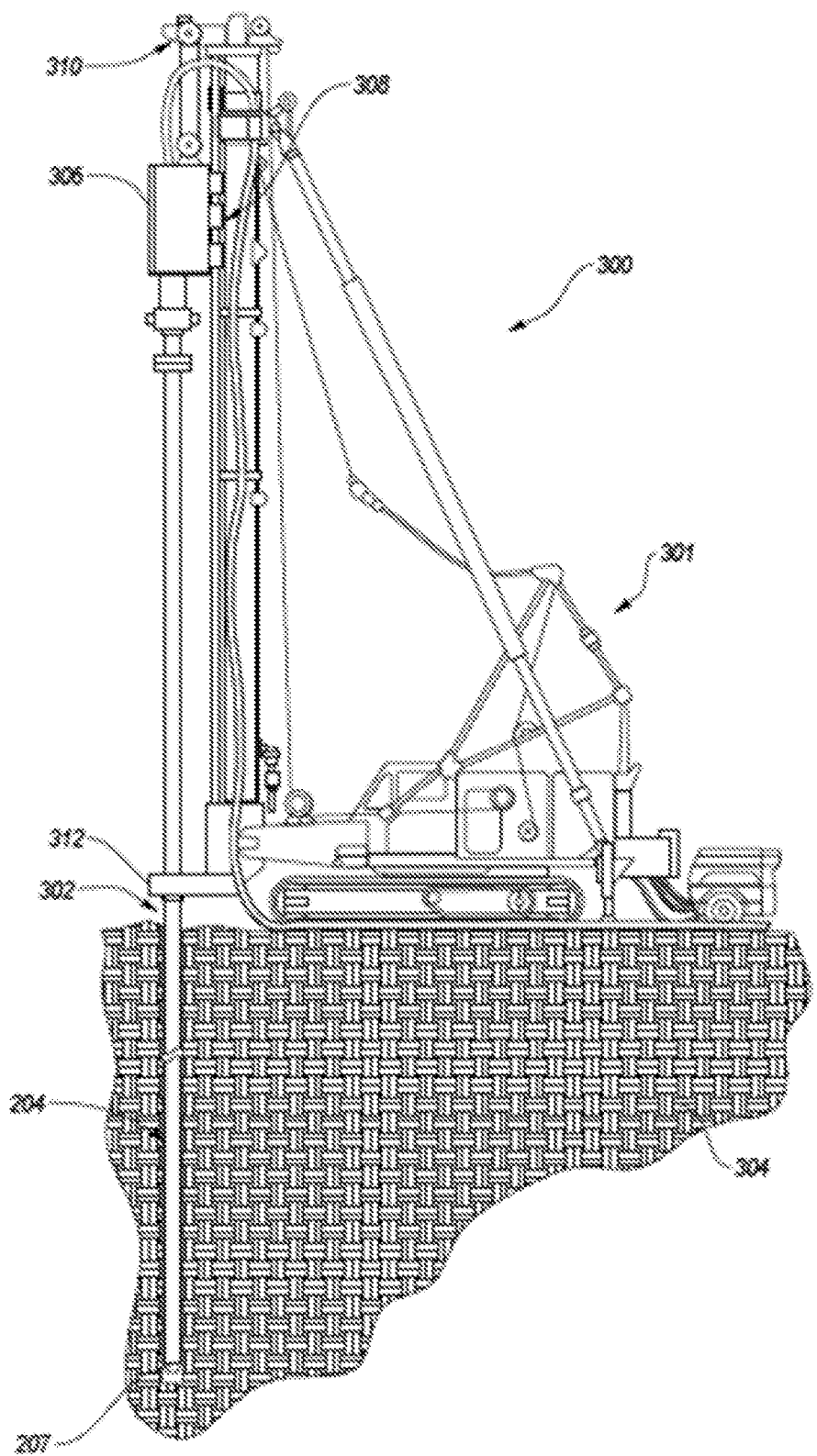
FIG. 6 illustrates a schematic diagram of a drilling system including drill string components having leading ends in accordance with one or more implementations of the present invention.

Referring now to FIG. 6, a drilling system 300 may be used to drill into a formation 304. The drilling system 300 may comprise a drill string 302 formed from a plurality of drill rods 204 or other drill string components 201-207. The drill rods 204 may be rigid and/or metallic, or alternatively may be constructed from other suitable materials. The drill string 302 may comprise a series of connected drill rods that may be assembled section-by-section as the drill string 302 advances into the formation 304. A drill bit 207 (for example, an open-faced drill bit or other type of drill bit) may be secured to the distal end of the drill string 302. As used herein the terms "down," "lower," "leading," and "distal end" refer to the end of the drill string 302 including the drill bit 207. While the terms "up," "upper," "trailing," or "proximal" refer to the end of the drill string 302 opposite the drill bit 207.

The drilling system 300 may comprise a drill rig 301 that may rotate and/or push the drill bit 207, the drill rods 204 and/or other portions of the drill string 302 into the formation 304. The drill rig 301 may comprise a driving mechanism, for example, a rotary drill head 306, a sled assembly 308, and a mast 310. The drill head 306 may be coupled to the drill string 302, and can rotate the drill bit 207, the drill rods 204 and/or other portions of the drill string 302. If desired, the rotary drill head 306 may be configured to vary the speed and/or direction that it rotates these components. The sled assembly 308 can move relative to the mast 310. As the sled assembly 308 moves relative to the mast 310, the sled assembly 308 may provide a force against the rotary drill head 306, which may push the drill bit 207, the drill rods 204 and/or other portions of the drill string 302 further into the formation 304, for example, while they are being rotated.

It will be appreciated, however, that the drill rig 301 does not require a rotary drill head, a sled assembly, a slide frame or a drive assembly and that the drill rig 301 may comprise other suitable components. It will also be appreciated that the drilling system 300 does not require a drill rig and that the drilling system 300 may comprise other suitable components that may rotate and/or push the drill bit 207, the drill rods 204 and/or other portions of the drill string 302 into the formation 304. For example, sonic, percussive, or down hole motors may be used.

As shown by FIG. 6, the drilling system 300 can further comprise a drill rod drill rod clamping device 312. In further detail, the driving mechanism may advance the drill string 302 and particularly a first drill rod 204 until a trailing portion of the first drill rod 204 is proximate an opening of a borehole formed by the drill string 302. Once the first drill rod 204 is at a desired depth, the drill rod clamping device 312 may grasp the first drill rod 204, which may help prevent inadvertent loss of the first drill rod 204 and the drill string 302 down the borehole. With the drill rod clamping device 312 grasping the first drill rod 204, the driving mechanism may be disconnected from the first drill rod 204.

An additional or second drill rod 204 may then be connected to the driving mechanism manually or automatically using a drill rod handling device, such as that described in U.S. Pat. No. 8,186,925, issued on May 29, 2012, the entire contents of which are hereby incorporated by reference herein. Next driving mechanism can automatically advance the pin end 104 of the second drill rod 204 into the box end 108 of the first drill rod 204. A joint between the first drill rod 204 and the second drill rod 204 may be made by threading the second drill rod 204 into the first drill rod 204. One will appreciate in light of the disclosure herein that the leading ends 114, 115 of the male and female threads 110, 112 of the drill rods 204 can prevent or reduce jamming and cross-threading even when the joint between the drill rods 204 is made automatically by the drill rig 301.

After the second drill rod 204 is connected to the driving mechanism and the first drill rod 204, the drill rod clamping device 312 may release the drill 302. The driving mechanism may advance the drill string 302 further into the formation to a greater desired depth. This process of grasping the drill string 302, disconnecting the driving mechanism, connecting an additional drill rod 204, releasing the grasp, and advancing the drill string 302 to a greater depth may be repeatedly performed to drill deeper and deeper into the formation.

Accordingly, FIGS. 1-9 and the corresponding text provide a number of different components and mechanisms for making joints between drill string components with increased load efficiency and load capacity, and that can also be resistant to wear, jamming and cross-threading. In addition to the foregoing, implementations of the present invention can also be described in terms acts and steps in a method for accomplishing a particular result. For example, a method of making a joint in a drill string with increased load efficiency and load capacity and with resistance to wear, jamming and cross-threading is described below with reference to the components and diagrams of FIGS. 1 through 9.

The method can involve inserting a pin end 104 of a first drill string component 102 into a box end 108 of a second drill string component 106. The method can also involve rotating the first drill sting component 102 relative to the second drill string component 108. The method can further involve abutting a planar leading end 114 of a male thread 110 on the pin end 104 of the first drill string component 102 against a planar leading end 115 of a female thread 112 on the box end 108 of the second drill string component 106.

The planar leading end 114 of the male thread 110 can be oriented at an acute angle 146 relative to a central axis 26 of the first drill string component 102. Similarly, the planar leading end 115 of the female thread 112 can be oriented at an acute angle 148 relative to a central axis 26 of the second drill string component 106.

The method can further involve sliding the planar leading end 114 of the male thread 110 against and along the planar leading end 115 of the female thread 112 to guide the male thread 110 into a gap between turns of the female thread 112. Sliding the planar leading end 114 of the male thread 110 against and along the planar leading end 115 of the female thread 112 can cause the first drill string component 102 to rotate relative to the second drill string component 106 due to the acute angles 146, 148 of the planar leading ends 114, 115 of the male and female threads 110, 112. The method can involve automatically rotating and advancing the first drill sting component 102 relative to the second drill string component 106 using a drill rig 301 without manually handling the drill string components 106, 108.

The planar leading end 115 of the female thread 112 can extend along an entire depth 132 of the female thread 110. The planar leading end 114 of the male thread 110 can extend along an entire depth 130 of the male thread 110. When rotating the first drill sting component 102 relative to the second drill string component 108, the depths of the planar leading ends 114, 115 of the female thread 112 and the male thread 110 can prevent jamming or wedging of the male and female threads 110, 112.

Thus, implementations of the foregoing provide various desirable features. For instance, by including leading ends or start faces which are optionally the full width of the thread, the tail-type thread start can be eliminated, thereby allowing: (a) substantially full circumference rotational positioning for threading; and (b) a guiding surface for placing mating threads into a threading position. For instance, the angled start face can engage a corresponding thread or thread start face and direct the corresponding thread into a threading position between helical threads. Moreover, at any position of the corresponding threads, the tail has been eliminated to virtually eliminate wedging prone geometry.

Similar benefits may be obtained regardless of whether threading is concentric or off-center in nature. For instance, in an off-center arrangement, a line intersecting a thread crest and a thread start face may comprise a joint taper. Under feed, the thread start face can mate with the mating thread crest in a manner that reduces or eliminates wedging as the intersection and subsequent thread resist wedging, jamming, and cross-threading. In such an embodiment, a joint taper may be sufficient to reduce the major diameter at a smaller end of a male thread to be less than a minor diameter at a large end of a female thread. Thus, off-center threading may be used for tapered threads.

Threads of the present disclosure may be formed in any number of suitable manners. For instance, as described previously, turning devices such as lathes may have difficultly creating an abrupt thread start face such as those disclosed herein. Accordingly, in some embodiments, a thread may be formed to comprise a tail. A subsequent grinding, milling, or other process may then be employed to remove a portion of the tail and create a thread start such as those described herein, or may be learned from a review of the disclosure herein. In other embodiments, other equipment may be utilized, including a combination of turning and other machining equipment. For instance, a lathe may produce a portion of the thread while other machinery can further process a male or female component to add a thread start face. In still other embodiments, molding, casting, single point cutting, taps and dies, die heads, milling, grinding, rolling, lapping, or other processes, or any combination of the foregoing, may be used to create a thread in accordance with the disclosure herein.

The present invention can thus be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A threaded drill string component comprising:
 a hollow body having a first end, an opposing second end, and a central axis extending through the hollow body; and
 two threads positioned on the first end of the hollow body; wherein:
  each of the two threads comprises a plurality of helical turns extending along the first end of the hollow body from a location proximate a leading edge of the first end of the hollow body toward the second end of the hollow body,
  each of the two threads has a thread root, a thread crest, a thread pitch, and a thread width, and
  each of the two threads has a clearance flank and a pressure flank, at least a portion of the pressure flank being oriented in a negative direction relative to a plane perpendicular to the central axis of the hollow body,
  the crest of each of the two threads circumscribes a frusta-conical surface extending over at least a portion of the axial length of the plurality of helical turns of the two threads, and wherein a generatrix of the frusta-conical surface is a straight line that lies at an angle relative to the central axis extending through the hollow body,
  the two threads have leading ends that are circumferentially spaced apart proximate the leading edge of the first end of the hollow body,
  the leading end of each of the two threads extends to a trailing edge of said thread, and
  the leading end of each of the two threads is oriented at an acute angle relative to the central axis of the hollow body and faces toward an adjacent turn of said thread.

2. The drill string component as recited in claim 1, wherein the width of each of the two threads increases uniformly from a first value to a final value across the full axial length of the plurality of helical turns.

3. The drill string component as recited in claim 1, wherein the width of each of the two threads increases non-uniformly from a first value to a final value across the full axial length of the plurality of helical turns.

4. The drill string component as recited in claim 1, wherein at least one of the width of each of the two threads and the pitch of each of the two threads increases from the first value to a final value across a portion of the axial length of the plurality of helical turns and remains constant thereafter.

5. The drill string component as recited in claim 1, wherein the root of each of the two threads circumscribes a cylindrical surface extending the axial length of the plurality of helical turns of the two threads.

6. The drill string component as recited in claim 1, wherein the leading end of each of the two threads comprises a planar surface extending normal to the hollow body.

7. The drill string component as recited in claim 6, wherein the planar surface of the leading end of each of the two threads extends the full thread width to prevent wedging or jamming of the threads.

8. The drill string component as recited in claim 1, wherein the respective leading ends of the two threads are evenly spaced about the first end of the hollow body.

9. The drill string component as recited in claim 1, wherein the hollow body is a thin-walled body having a wall thickness between 5 percent and 15 percent of an outer diameter of the hollow body.

10. The drill string component as recited in claim 1, wherein the first end comprises a box end and the threads comprise female threads.

11. The drill string component as recited in claim 1, wherein the drill string component comprises one of a drill rod, a casing, an adaptor coupling, a reamer, a drill bit, or a locking coupling.

12. The drill string component as recited in claim 1, wherein the leading end of each of the two threads is offset from the first end of the hollow body by a distance equal to or less than the thread width.

\* \* \* \* \*